(12) United States Patent
Jiang et al.

(10) Patent No.: US 12,389,834 B2
(45) Date of Patent: Aug. 19, 2025

(54) GRAFTING DEVICE AND GRAFTING METHOD BASED ON UV ADHESIVE

(71) Applicant: Research Center of Intelligent Equipment, Beijing Academy of Agriculture and Forestry Sciences, Beijing (CN)

(72) Inventors: Kai Jiang, Beijing (CN); Chunjiang Zhao, Beijing (CN); Qingchun Feng, Beijing (CN); Liping Chen, Beijing (CN); Tao Li, Beijing (CN); Wenqian Huang, Beijing (CN); Qian Zhang, Beijing (CN)

(73) Assignee: Research Center of Intelligent Equipment, Beijing Academy of Agriculture and Forestry Sciences, Beijing (CN)

( * ) Notice: Subject to any disclaimer, the term of this patent is extended or adjusted under 35 U.S.C. 154(b) by 0 days.

(21) Appl. No.: 18/638,357

(22) Filed: Apr. 17, 2024

(65) Prior Publication Data
US 2025/0234812 A1 Jul. 24, 2025

(30) Foreign Application Priority Data
Jan. 19, 2024 (CN) .......................... 202410079032.9

(51) Int. Cl.
*A01G 2/38* (2018.01)
(52) U.S. Cl.
CPC ...................................... *A01G 2/38* (2018.02)

(58) Field of Classification Search
CPC ............... A01G 2/35; A01G 2/32; A01G 2/30
See application file for complete search history.

(56) References Cited

U.S. PATENT DOCUMENTS

| | | | | |
|---|---|---|---|---|
| 5,832,661 A | * | 11/1998 | Tereshchenko | A01G 2/38 47/DIG. 3 |
| 5,832,662 A | * | 11/1998 | Tereshchenko | C08J 5/18 47/6 |

(Continued)

FOREIGN PATENT DOCUMENTS

| | | | | | |
|---|---|---|---|---|---|
| CN | 110583264 A | * | 12/2019 | | A01G 2/30 |
| JP | WO-9007869 A1 | * | 7/1990 | | A01G 2/35 |
| KR | 20070109926 A | * | 11/2007 | | A01G 2/35 |

*Primary Examiner* — Monica L Perry
(74) *Attorney, Agent, or Firm* — Rimon PC

(57) ABSTRACT

A grafting device and a grafting method based on a UV (Ultraviolet Rays) adhesive are provided. The grafting device includes a workbench, a transfer mechanism, a seedling loading mechanism, a cutting mechanism, an adhesive spraying mechanism, a curing mechanism and a seedling unloading mechanism. Along the circumferential direction of the transfer mechanism, a seedling loading station, an adhesive spraying station, a curing station and a seedling unloading station are sequentially arranged. The seedling loading mechanism is configured for bearing a rootstock and a scion, and the cutting mechanism is configured for cutting the rootstock and the scion. The transfer mechanism is configured for receiving and fixing the rootstock and the scion, and transporting the rootstock and the scion intermittently from the seedling loading station, the adhesive spraying station, the curing station and the seedling unloading station in turn to obtain a grafted seedling.

18 Claims, 10 Drawing Sheets

(56) References Cited

U.S. PATENT DOCUMENTS

| | | | |
|---|---|---|---|
| 11,903,346 B2* | 2/2024 | Reeves | A01G 2/30 |
| 2018/0042183 A1* | 2/2018 | Nakayama | B29C 65/08 |
| 2019/0110405 A1* | 4/2019 | Nakayama | A01G 2/32 |

* cited by examiner

GRAFTING DEVICE AND GRAFTING METHOD BASED ON UV ADHESIVE

CROSS-REFERENCE TO RELATED APPLICATION

This patent application claims the benefit and priority of Chinese Patent Application No. 2024100790329, entitled "GRAFTING DEVICE AND GRAFTING METHOD BASED ON UV ADHESIVE" filed on Jan. 19, 2024, the disclosure of which is incorporated by reference herein in its entirety as part of the present application.

TECHNICAL FIELD

The present disclosure relates to the technical field of grafting, in particular to a grafting device and a grafting method based on UV (Ultraviolet Rays) adhesive.

BACKGROUND

Grafting means that the branch or bud of one plant is grafted to the stem or root of another plant, so that the two parts connected together grow into a complete plant. The grafting of melon vegetables can improve the disease resistance and yield of plants and effectively control diseases and insect pests, so grafting has been widely popularized.

In recent years, machine grafting has been greatly developed. The machine can automatically clamp, transport, cut, butt and clamp rootstocks and scions. Compared with manual grafting, the quality and work efficiency of machine cutting are improved. The plastic clip is usually adopted to fix the grafted seedling in traditional grafting. In China, dozens of tons of plastic clips are adopted in grafting production every year. It is difficult to manually recycle the plastic clips, and the cost is high. Therefore, seedling enterprises sell grafted seedlings with clips. However, planters discard the plastic clips directly in the planting field, which seriously affects the planting environment. The waste of accumulated plastic clips in grafting production all the year round is huge.

SUMMARY

The present disclosure provides a grafting device and a grafting method based on UV adhesive so as to solve the problems of waste and pollution caused by difficulty in automatically completing grafting operation by the grafting device, not high grafting quality and plastic clips adopted for grafting in the prior art.

In order to solve the foregoing technical problems, the present disclosure is realized as follows.

In a first aspect, the present disclosure provides a grafting device based on UV adhesive, including:
  a workbench, a transfer mechanism, a seedling loading mechanism, a cutting mechanism, an adhesive spraying mechanism, a curing mechanism and a seedling unloading mechanism.

The transfer mechanism, the seedling loading mechanism, the cutting mechanism, the adhesive spraying mechanism, the curing mechanism and the seedling unloading mechanism are sequentially arranged on the workbench. A seedling loading station, an adhesive spraying station, a curing station and a seedling unloading station are arranged in turn along a circumferential direction of the transfer mechanism.

The seedling loading mechanism and the cutting mechanism are arranged at the seedling loading station. The adhesive spraying mechanism is arranged at the adhesive spraying station. The curing mechanism is arranged at the curing station. The seedling unloading mechanism is arranged at the seedling unloading station.

At the seedling loading station, the seedling loading mechanism is configured for bearing a rootstock and a scion, the transfer mechanism is configured for receiving and fixing the rootstock and the scion, and the cutting mechanism is configured for cutting the rootstock and the scion.

The transfer mechanism is configured for moving the rootstock and the scion located at the seedling loading station to the adhesive spraying station, and abutting the rootstock against the scion to obtain a grafted seedling.

At the adhesive praying station, the adhesive spraying mechanism is configured for spraying UV adhesive on the periphery of a joint portion of the rootstock and the scion. The transfer mechanism is configured for transferring the grafted seedling located at the adhesive spraying station to the curing station.

At the curing station, the curing mechanism is configured for curing the UV adhesive sprayed on the grafted seedling. The transfer mechanism is configured for transferring the grafted seedling located at the curing station to the seedling unloading station.

At the seedling unloading station, the seedling unloading mechanism is configured for performing a seedling unloading treatment on the grafted seedling.

According to the grafting device based on UV adhesive provided by the present disclosure, the transfer mechanism may include a swing driving assembly, a rotating platform and multiple transfer units.

The swing driving assembly may be arranged on the workbench, the rotating platform may be arranged on the swing driving assembly, the rotating platform may be provided with a plurality of transfer units along a circumferential direction of the rotating platform, and each of the multiple transfer units may be configured for clamping the rootstock and the scion.

Each of the multiple transfer units may be able to move to the seedling loading station, the adhesive spraying station, the curing station and the seedling unloading station in turn under driving of the rotating platform.

According to the grafting device based on UV adhesive provided by the present disclosure, each of the multiple transfer units includes a rootstock clamping assembly and a scion clamping assembly.

The rootstock clamping assembly and the scion clamping assembly are arranged side by side. The rootstock clamping assembly is movable between a first position and a second position.

Under a condition that the rootstock clamping assembly is at the first position, the rootstock clamping assembly is configured to get away from the scion clamping assembly, and the rootstock clamping assembly and the scion clamping assembly are configured to be matched with the seedling loading mechanism to clamp and fix the rootstock and the scion.

Under a condition that the rootstock clamping assembly is at the second position, the rootstock clamping assembly is configured to get close to the scion clamping assembly for abutting the rootstock against the scion and clamping the grafted seedling.

The rootstock clamping assembly may include a linear module, a rootstock clamping jaw and a rootstock support frame. The rootstock support frame may be arranged on one side of the rootstock clamping jaw, a sliding table of the linear module may be connected with the rootstock clamping jaw. The rootstock clamping jaw may be configured for clamping the rootstock. The rootstock support frame may be configured for supporting the rootstock. The linear module may be configured for driving the rootstock clamping jaw to move between the first position and the second position.

The scion clamping assembly may include a scion clamping jaw and a scion support frame. The scion support frame may be arranged on one side of the scion clamping jaw. The scion clamping jaw may be configured for clamping the scion. The scion support frame may be configured for supporting the scion.

The rootstock clamping jaw and the rootstock support frame may be arranged at a same height, and the scion clamping jaw and the scion support frame may be arranged at a same height.

According to the grafting device based on UV adhesive provided by the present disclosure, the seedling loading mechanism may include a hanger frame, a cross plate and a first telescopic driving member.

The hanger frame may be arranged on the workbench. The first telescopic driving member may be arranged on the hanger frame. An output end of the first telescopic driving member may be connected with the cross plate to drive the cross plate to reciprocate along a horizontal direction.

Both ends of the cross plate along the horizontal direction may be provided with a first auxiliary cutting block and a second auxiliary cutting block, respectively.

A first groove may be formed in one end, facing an outer side of the workbench, of the first auxiliary cutting block, the first groove may extend along the horizontal direction. The first groove may be configured for accommodating the rootstock. A first feed slot may be further formed in the first auxiliary cutting block. The first feed slot may be arranged obliquely. The first feed slot may penetrate a top surface of the first auxiliary cutting block and a side surface of the first auxiliary cutting block and may penetrate the first groove. The first feed slot may be configured for guiding a first cutter of the cutting mechanism to cut the rootstock.

A second groove may be formed in one end, facing the outer side of the workbench, of the second auxiliary cutting block. The second groove may extend along the horizontal direction, and the second groove may be configured for accommodating the scion. A second feed slot may be further formed in the second auxiliary cutting block. The second feed slot may be arranged obliquely. The second feed slot may penetrate a top surface of the second auxiliary cutting block and a side surface of the second auxiliary cutting block and may penetrate the second groove. The second feed slot may be configured for guiding a second cutter of the cutting mechanism to cut the scion.

According to the grafting device based on UV adhesive provided by the present disclosure, the seedling loading mechanism may further include a seedling pressure rod and a second telescopic driving member.

Strip holes may be formed in one end, close to the first auxiliary cutting block, of the cross plate. The strip hole extends along the horizontal direction. Each of the seedling pressure rods may penetrate a corresponding one of the strip holes. The second telescopic driving member may be arranged on the cross plate. An output end of the second telescopic driving member may be connected with the seedling pressure rod to drive the seedling pressure rod to move along the corresponding one of the strip holes, and the seedling pressure rods may be configured for making contact with or being separated from petioles of the rootstock and may be able to assist the cutting mechanism to complete cutting operation.

According to the grafting device based on UV adhesive provided by the present disclosure, the cutting mechanism may include a transfer seat, a cutter rest, a third telescopic driving member and a fourth telescopic driving member.

The third telescopic driving member may be arranged on the workbench, and an output end of the third telescopic driving member may be connected with the transfer seat to drive the transfer seat to reciprocate along the horizontal direction.

The fourth telescopic driving member may be arranged on the transfer seat, an output end of the fourth telescopic driving member may be connected with the cutter rest, and the telescopic direction of the fourth telescopic driving member may be arranged obliquely relative to the horizontal plane to drive the cutter rest to cut the rootstock and the scion.

The cutter rest may be provided with a rootstock cutter and a scion cutter. The rootstock cutter and the scion cutter may be arranged in parallel, an inclination angle of the rootstock cutter may be adapted to an inclination angle of the first feed slot. An inclination angle of the scion cutter may be adapted to the inclination angle of the second feed slot.

According to the grafting device based on UV adhesive provided by the present disclosure, the adhesive spraying mechanism may include the spray valve, an adhesive storage tank and a displacement platform.

The displacement platform may be arranged on the workbench, the spray valve and the adhesive storage tank may be arranged on the displacement platform, and the spray valve may communicate with the adhesive storage tank. The spray valve may be configured for spraying UV adhesive on the periphery of the joint portion of the rootstock and the scion.

According to the grafting device based on UV adhesive provided by the present disclosure, the curing mechanism may include a support and a UV light source.

The support may be arranged on the workbench, the UV light source may be arranged on the support, and the UV light source may be configured to irradiate the UV adhesive through ultraviolet rays to cure the UV adhesive.

According to the grafting device based on UV adhesive provided by the present disclosure, the seedling unloading mechanism may include a clamping assembly and a belt conveying assembly.

The clamping assembly may include a flexible seedling clamping jaw, a rotation driving member and a fifth telescopic driving member.

The fifth telescopic driving member may be arranged on the workbench, an output end of the fifth telescopic driving member may be connected with the rotation driving member, and an output end of the rotation driving member may be connected with the flexible seedling clamping jaw.

The fifth telescopic driving member may be configured for driving the rotation driving member to reciprocate in the horizontal direction, and the rotation driving member may be configured for driving the flexible seedling clamping jaw to switch between a first state and a second state.

Under a condition that the flexible seedling clamping jaw may be at the first state, the flexible seedling clamping jaw may be arranged along the horizontal direction. Under a condition that the flexible seedling clamping jaw may be at the second state, the flexible seedling clamping jaw may be arranged along the vertical direction.

In a second aspect, the present disclosure provides a grafting method based on UV adhesive, including:
acquiring the image information of the grafted seedling;
acquiring the morphological characteristics of the grafted seedling according to the image information;

determining adhesive spraying information for the grafted seedling according to the morphological characteristics of the grafted seedling; and controlling the adhesive spraying mechanism to spray adhesive on the grafted seedling according to the adhesive spraying information.

According to the grafting device and the grafting method based on UV adhesive provided by the embodiments, through the collaborative cooperation that the seedling loading mechanism and the cutting mechanism are arranged at the seedling loading station, the adhesive spraying mechanism is arranged at the adhesive spraying station, the curing mechanism is arranged at the curing station, the seedling unloading mechanism is arranged at the seedling unloading station, the transfer mechanism is arranged to transport the rootstock and the scion among the seedling loading station, the adhesive spraying station, the curing station and the seedling unloading station, and the abutting of the rootstock and the scion is completed at the adhesive spraying station, at the seedling loading station, the seedling loading mechanism bears the rootstock and the scion, and the transfer mechanism receives and fixes the rootstock and the scion, pre-positioning of the cutting operation is automatically completed, so that the rootstock and the scion can be accurately cut, and the cutting precision of incisions is improved. At the adhesive spraying station, the transfer mechanism can complete automatic abutting of the rootstock and the scion, so that the abutting efficiency of incisions is improved. The grafted seedling is sprayed with UV adhesive at the adhesive spraying station, the UV adhesive on the grafted seedling is cured to form an adhesive film at the curing station, and the grafted seedling is avoided from being extruded through the package of the flexible adhesive film on the grafted seedling, so that a better fixation effect is obtained.

From the foregoing, the grafting device based on UV adhesive provided by the embodiments can automatically and efficiently complete the receiving, fixing, positioning, cutting, abutting, adhesive spraying, curing and seedling unloading operations of the rootstock and the scion, so that the degree of automation is high, the abutting lamination efficiency of incisions is improved, the effect of the flexible fixation on the grafted seedling is good, the grafting quality and grafting efficiency are improved, and the resources are saved.

BRIEF DESCRIPTION OF THE DRAWINGS

To describe the technical solutions in the embodiments of the present disclosure or in the prior art more clearly, the following briefly describes the drawings required for describing the embodiments or the prior art. Apparently, the drawings in the following description show some embodiments of the present disclosure, and a person of ordinary skill in the art may still derive other drawings from these drawings without creative efforts.

Figure 1:
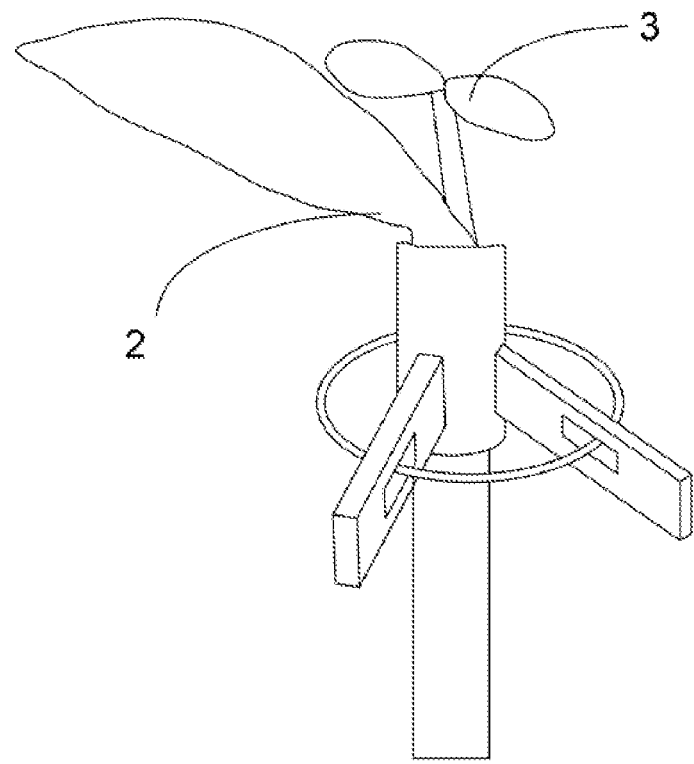
FIG. 1 is a schematic diagram of a rootstock and a scion fixed with a plastic clip in the prior art.

LIST OF THE REFERENCE CHARACTERS 1 grafting device;
11 workbench; 111 fixed mount;
12 transfer mechanism; 121 swing driving assembly; 122 rotating platform; 123 transfer unit; 1231 rootstock clamping assembly; 1232 scion clamping assembly; 12311 linear module; 12312 rootstock clamping jaw; 12313 rootstock support frame; 12321 scion clamping jaw; 12322 scion support frame; 1211 pneumatic slip ring; 1212 swing driving member;
13 seedling loading mechanism; 131 hanger frame; 132 cross plate; 133 first telescopic driving member; 134 seedling pressure rod; 135 second telescopic driving member; 1321 first auxiliary cutting block; 1322 second telescopic driving block; 1323 strip hole; 13211 first groove; 13212 first feed slot; 13221 second groove; 13222 second feed slot;
14 cutting mechanism; 141 transfer seat; 142 cutter rest; 143 third telescopic driving member; 144 fourth telescopic driving member; 145 detection sensor; 1421 rootstock cutter; 1422 scion cutter;
15 adhesive spraying mechanism; 151 spray valve; 152 adhesive storage tank; 153 displacement platform;
16 curing mechanism; 161 support; 162 UV light source;
17 seedling unloading mechanism; 171 clamping assembly; 1711 flexible seedling clamping jaw; 1712 rotation driving member; 1713 fifth telescopic driving member; 172 belt conveying assembly;
18 seedling loading disc; 19 control center;
2 rootstock; 3 scion;

P1 seedling loading station; P2 adhesive spraying station; P3 curing station; P4 seedling unloading station; M1 first position; and M2 second position.

DETAILED DESCRIPTION OF THE EMBODIMENTS

To make the objectives, technical solutions, and advantages of the embodiments of the present disclosure clearer, the following clearly and completely describes the technical solutions in the embodiments of the present disclosure with reference to the drawings in the embodiments of the present disclosure. Apparently, the described embodiments are some but not all of the embodiments of the present disclosure. Based on the embodiment in the present disclosure, all other embodiments obtained by the ordinary technical staff in the art under the premise of without contributing creative labor belong to the scope protected by the present disclosure.

As shown in FIG. 1 to FIG. 19, through specific embodiments and application scenarios thereof, a grafting device and a grafting method based on UV adhesive provided by the embodiment of the present disclosure are described in detail.

Figure 3:
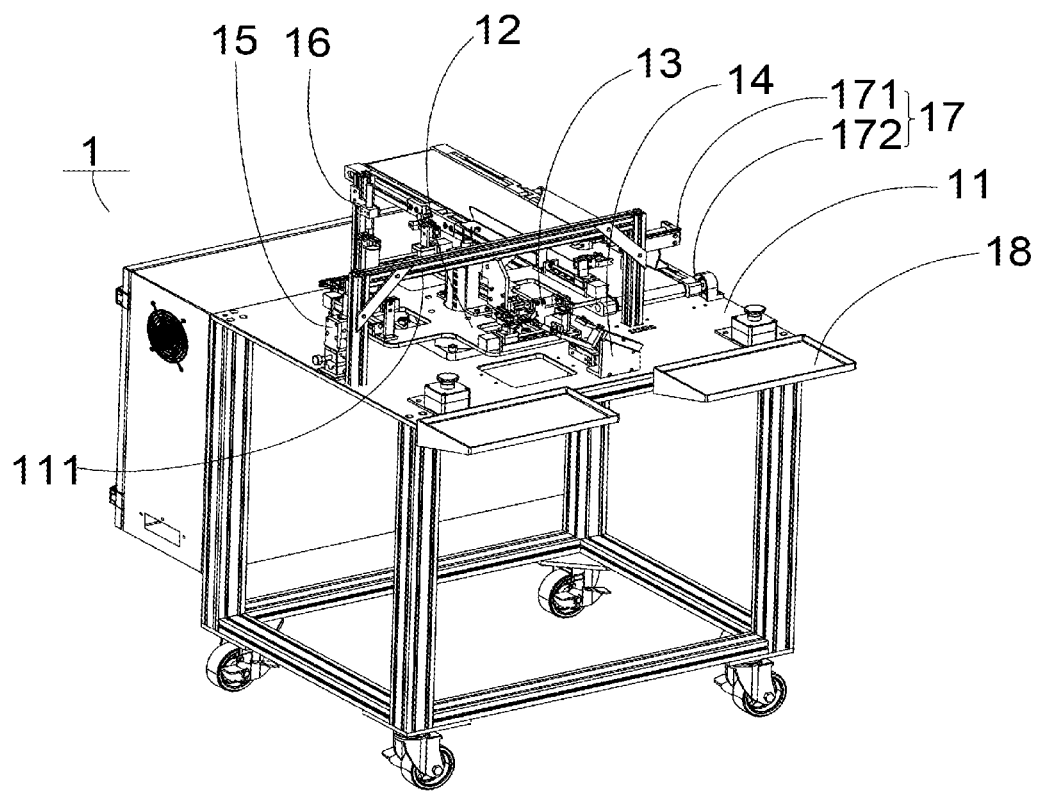
FIG. 3 is a spatial structural schematic diagram of the grafting device provided by the present disclosure.
Figure 4:
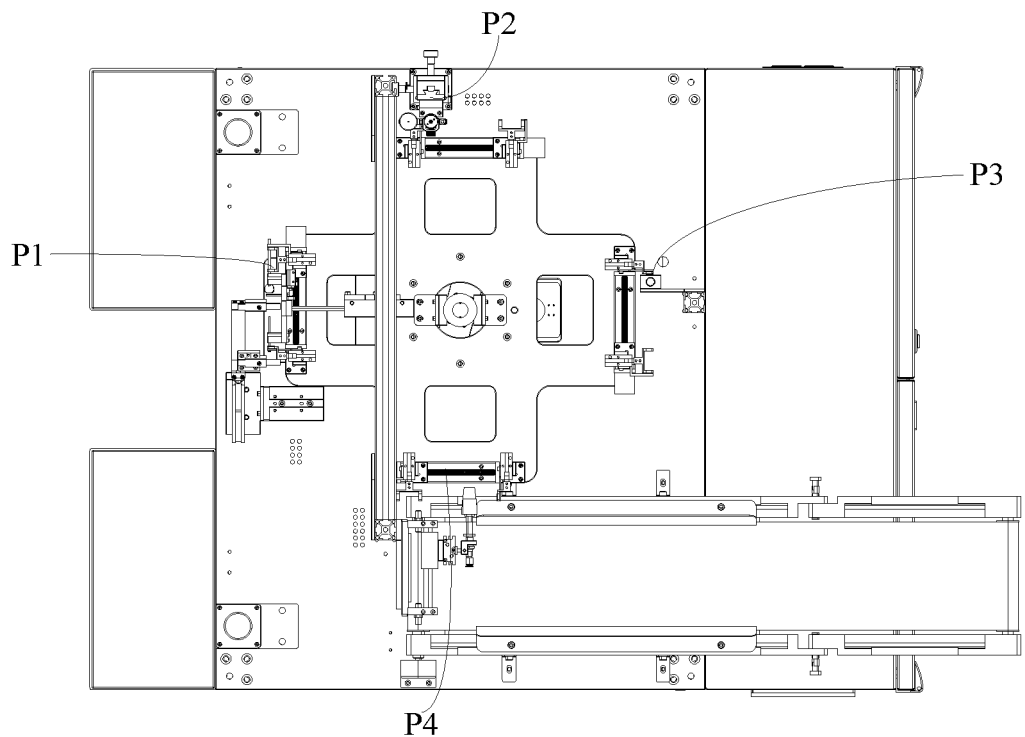
FIG. 4 is a head-down structural schematic diagram of the grafting device provided by the present disclosure.
Figure 5:
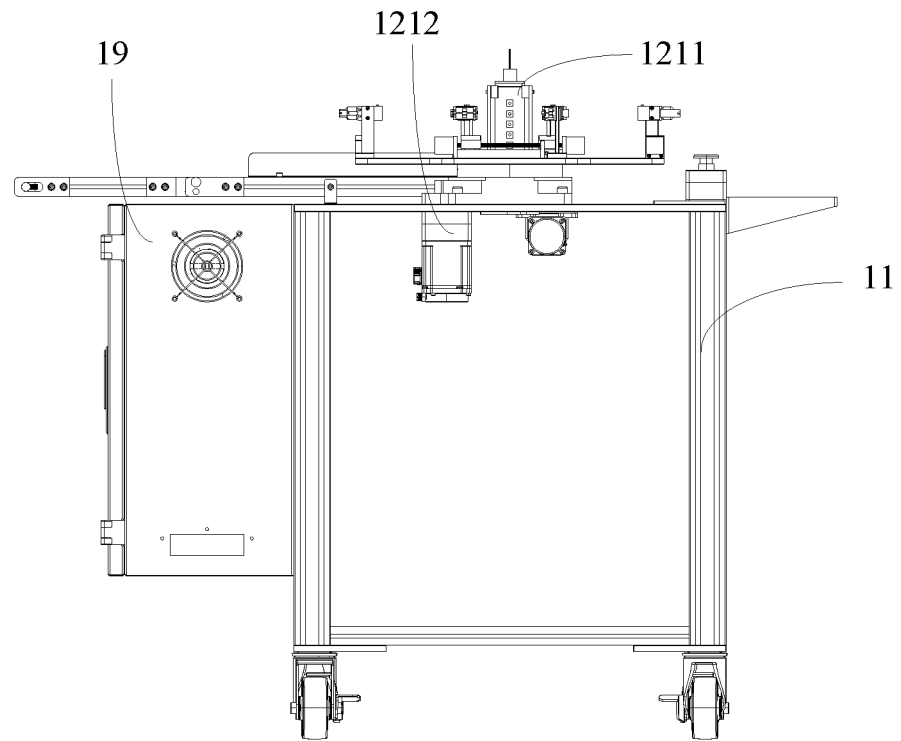
FIG. 5 is a side-looking structural schematic diagram of the grafting device provided by the present disclosure.
Figure 6:
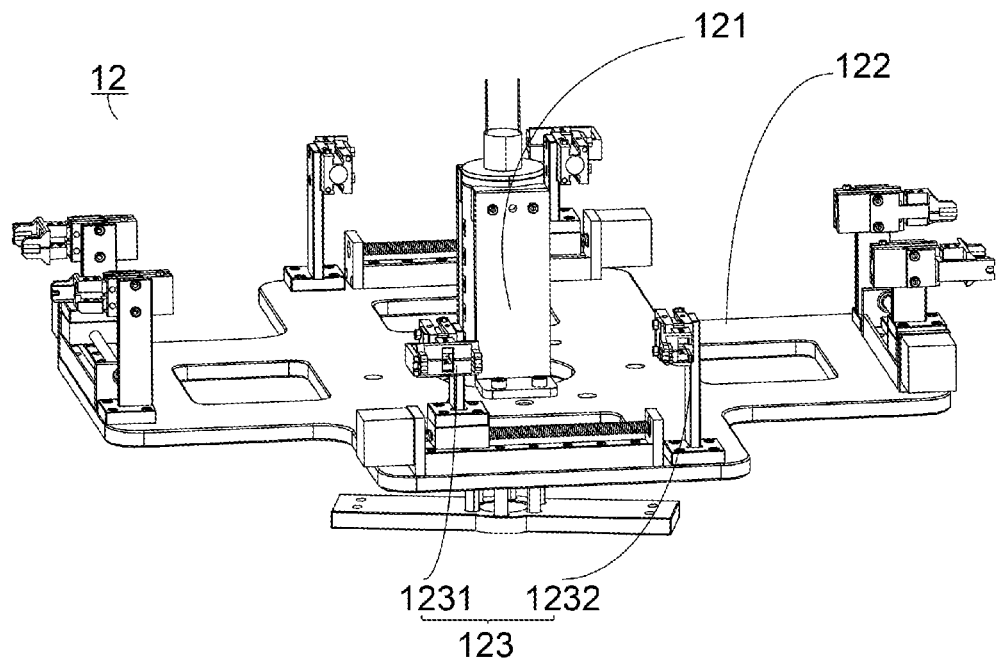
FIG. 6 is a spatial structural schematic diagram of a transfer mechanism provided by the present disclosure.
Figure 18:
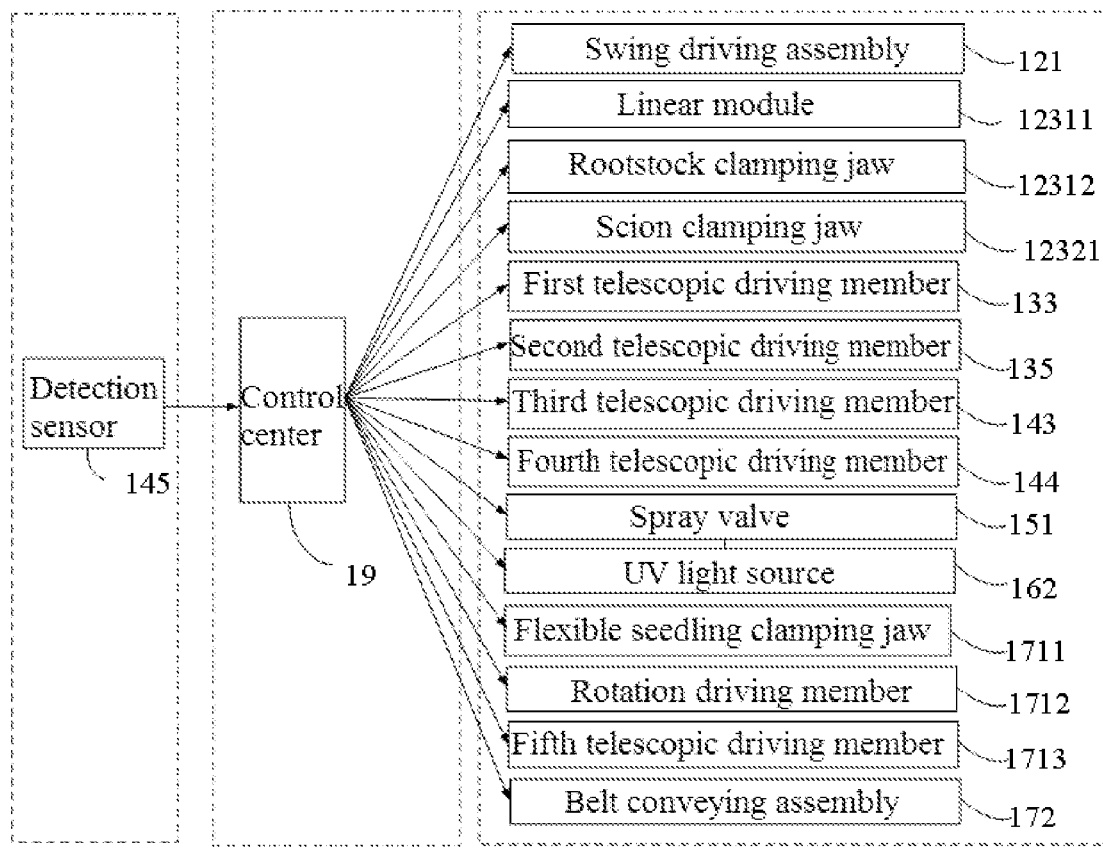
FIG. 18 is a control structure diagram of the grafting device provided by the present disclosure.

In a first aspect, as shown in FIG. 3, FIG. 4 and FIG. 18, the embodiment provides a grafting device based on UV adhesive, including a workbench 11, a transfer mechanism 12, a seedling loading mechanism 13, a cutting mechanism 14, an adhesive spraying mechanism 15, a curing mechanism 16 and a seedling unloading mechanism 17.

The transfer mechanism 12, the seedling loading mechanism 13, the cutting mechanism 14, the adhesive spraying mechanism 15, the curing mechanism 16 and the seedling unloading mechanism 17 are sequentially arranged on the workbench 11.

A seedling loading station P1, an adhesive spraying station P2, a curing station P3 and a seedling unloading station P4 are arranged in turn along the circumferential direction of the transfer mechanism 12.

The seedling loading mechanism 13 and the cutting mechanism 14 are arranged at the seedling loading station P1. The adhesive spraying mechanism 15 is arranged at the adhesive spraying station P2. The curing mechanism 16 is arranged at the curing station P3. The seedling unloading mechanism 17 is arranged at the seedling unloading station P4.

At the seedling loading station P1, the seedling loading mechanism 13 is configured for bearing a rootstock 2 and a scion 3, the transfer mechanism 12 is configured for receiving and fixing the rootstock 2 and the scion 3, and the cutting mechanism 14 is configured for cutting the rootstock 2 and the scion 3.

The transfer mechanism 12 is configured for moving the rootstock 2 and the scion 3 located at the seedling loading station P1 to the adhesive spraying station P2, and abutting the rootstock 2 against the scion 3 to obtain a grafted seedling.

At the adhesive spraying station P2, the adhesive spraying mechanism 15 is configured for spraying UV adhesive on the periphery of joint portion of the rootstock 2 and the scion 3. The transfer mechanism 12 is configured for transferring the grafted seedling located at the adhesive spraying station P2 to the curing station P3.

At the curing station P3, the curing mechanism 16 is configured for curing the UV adhesive sprayed on the grafted seedling. The transfer mechanism 12 is configured for transferring the grafted seedling located at the curing station P3 to the seedling unloading P4.

At the seedling unloading station P4, the seedling unloading mechanism 17 is configured for carrying out seedling unloading on the grafted seedling.

Figure 2:
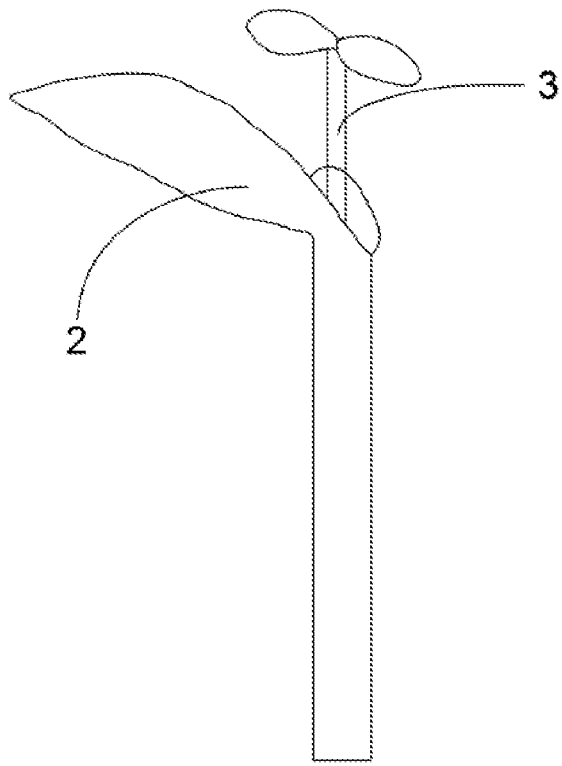
FIG. 2 is a schematic diagram of a rootstock and a scion fixed with UV adhesive provided by the present disclosure.

It can be understood that as shown in FIG. 1 and FIG. 2, for the traditional grafted seedling, the periphery of the joint portion of the grafted seedling is fixed with a plastic clip, but UV (Ultraviolet Rays) adhesive is adopted instead of the traditional plastic clips in the embodiment. The UV adhesive is adhesive that can be cured by ultraviolet light irradiation. After the UV adhesive is sprayed on the grafted seedling, the UV adhesive is cured by ultraviolet light irradiation, and a formed adhesive film forms a flexible package on the grafted seedling, which is more beneficial to the growth of the grafted seedling. Moreover, UV adhesive grafting has the high-quality characteristics of low cost, automatic shedding, biodegradability and the like. By adopting UV adhesive, the traditional seedling grafting mode can be changed, so that the seedling quality and efficiency are improved, and the planting environmental pollution problem is solved.

The transfer mechanism 12 may adopt a mechanical arm to transport the rootstock 2 and the scion 3 among the seedling loading station P1, the adhesive spraying station P2, the curing station P3 and the seedling unloading station P4, and the transfer mechanism 12 may also adopt a turntable to rotate and transport the rootstock 2 and the scion 3 among the seedling loading station P1, the adhesive spraying station P2, the curing station P3 and the seedling unloading station P4.

Specifically, the transfer mechanism 12 bears and fixes the rootstock 2 and the scion 3 in a clamping mode or an adsorption mode, and the rootstock 2 and the scion 3 may be loaded horizontally, vertically or at any angle.

In practical application, first, at the seedling loading station P1, the rootstock 2 and the scion 3 are put in bearing parts of the seedling loading station 13 by operating personnel, respectively, the transfer mechanism 12 receives and fixes the rootstock 2 and the scion 3 synchronously, and the cutting mechanism 14 cuts the rootstock 2 and the scion 3, respectively. Then, the transfer mechanism 12 transports the rootstock 2 and the scion 3 after being cut to the adhesive spraying station P2, and the rootstock 2 are abutted against the scion 3 to obtain a grafted seedling. Then, the grafted seedling is sprayed with UV adhesive. Next, the transfer mechanism 12 transfers the grafted seedling to the curing station P3 to cure the grafted seedling. Finally, the transfer mechanism 12 transfers the grafted seedling to the seedling unloading station P4, and the seedling unloading mechanism 17 takes out the grafted seedling.

The grafting device 1 in the embodiment further includes a control center 19. The control center 19 in the embodiment is arranged on one side, close to the curing station P3, of the workbench 11. The control center 19 is configured for controlling the transportation of the transfer mechanism 12 on the rootstock 2 and the scion 3, the abutting of the transfer mechanism 12 on the rootstock 2 and the scion 3, the transportation of the transfer mechanism 12 on the grafted seedling, the bearing of the seedling loading mechanism 13 on the rootstock 2 and the scion 3, the cutting of the cutting mechanism 14 on the rootstock 2 and the scion 3, the spraying operation of the adhesive spraying mechanism 15, the curing operation of the curing mechanism 16, and the clamping of the seedling unloading mechanism 17 on the grafted seedling.

The control center 19 may include a PLC (Programmable Logic Controller) controller.

According to the grafting device 1 based on UV adhesive provided by the present disclosure, through the collaborative cooperation that the seedling loading station 13 and the cutting mechanism 14 are arranged at the seedling loading station P1, the adhesive spraying mechanism 15 is arranged at the adhesive spraying station P2, the curing mechanism 16 is arranged at the curing station P3, the seedling unloading mechanism 17 is arranged at the seedling unloading station P4, the transfer mechanism 12 is arranged to transport the rootstock 2 and the scion 3 among the seedling loading station P1, the adhesive spraying station P2, the curing station P3 and the seedling unloading station P4, and the abutting of the rootstock 2 and the scion 3 is completed at the adhesive spraying station P2, at the seedling loading station P1, the seedling loading mechanism 13 bears the rootstock 2 and the scion 3, and the transfer mechanism 12 receives and fixes the rootstock 2 and the scion 3, prepositioning of the cutting operation is automatically completed, so that the rootstock 2 and the scion 3 can be accurately cut, and the cutting precision of incisions is improved. At the adhesive spraying station P2, the transfer mechanism 12 can complete automatic abutting of the rootstock 2 and the scion 3, so that the abutting efficiency of incisions is improved. The grafted seedling is sprayed with UV adhesive at the adhesive spraying station P2, the UV adhesive on the grafted seedling is cured to form an adhesive film at the curing station, and the grafted seedling is avoided from being extruded through the package of the flexible adhesive film on the grafted seedling, so that a better fixation effect is obtained.

From the foregoing, the grafting device 1 based on UV adhesive provided by the present disclosure can automatically and efficiently complete the receiving, fixing, positioning, cutting, abutting, adhesive spraying, curing and seedling unloading operations of the rootstock 2 and the scion 3, so that the degree of automation is high, the abutting lamination efficiency of incisions is improved, the effect of the flexible fixation on the grafted seedling is good, the grafting quality and grafting efficiency are improved, and the resources are saved.

In some embodiments, as shown in FIG. 3, FIG. 4, FIG. 5 and FIG. 6, the transfer mechanism 12 in the embodiment includes a swing driving assembly 121, a rotating platform 122 and multiple transfer units 123.

The swing driving assembly 121 is arranged on the workbench 11. The rotating platform 122 is arranged on the swing driving assembly 121. The rotating platform 122 is provided with the multiple transfer units 123 along the circumferential direction of the rotating platform 122. The transfer units 123 are configured for clamping the rootstock 2 and the scion 3.

The transfer units 123 can move to the seedling loading station P1, the adhesive spraying station P2, the curing station P3 and the seedling unloading station P4 in turn under the driving of the rotating platform 122.

It can be understood that the swing driving assembly 121 includes a swing driving member 1212 and a pneumatic slip ring 1211. The swing driving assembly 1212 is arranged on the workbench 11. An output end of the swing driving member 1212 is connected with the pneumatic slip ring 1211. A stator of the pneumatic slip ring 1211 is connected with the workbench 11, and a rotor of the pneumatic slip ring 1211 is connected with the rotating platform 122. The pneumatic slip ring 1211 and the rotating platform 122 are coaxially arranged.

The swing driving member 1212 may be a motor.

In the practical work, the swing driving member 1212 drives the pneumatic slip ring 1211 to rotate, the pneumatic slip ring 1211 drives the rotating platform 122 to rotate, and the rotating platform 122 drives the transfer units 123 to move to a position corresponding to any one of the seedling loading station P1, the adhesive spraying station P2, the curing station P3 and the seedling unloading station P4.

The transfer units 123 can clamp the rootstock 2 and the scion 3, respectively, and transport the rootstock 2 and the scion 3 among different stations along with the rotation of the rotating platform 122.

The control center 19 can control the rotation of the rotating platform 122, so that the transfer unit 123 can operate at the corresponding station, and the transfer unit 123 can move to the next station for the next operation after the operation at the current station is completed, the grafting device 1 can carry out coordinated operations on the seedling loading, clamping, cutting, abutting, adhesive spraying, curing and seedling unloading of multiple rootstocks 2 and multiple scions 3. The work efficiency of the grafting device 1 is improved, and the grafting operation on the rootstocks 2 and the scions 3 is completed in a large batch.

Figure 7:
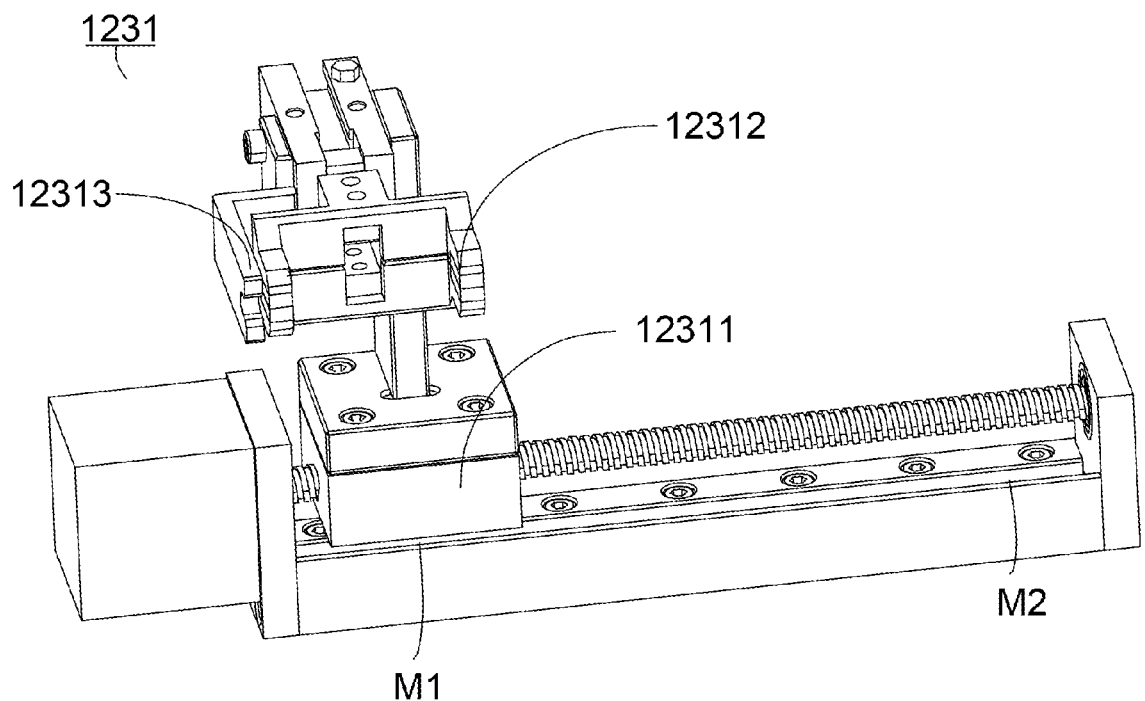
FIG. 7 is a spatial structural schematic diagram of a rootstock clamping assembly provided by the present disclosure.
Figure 8:
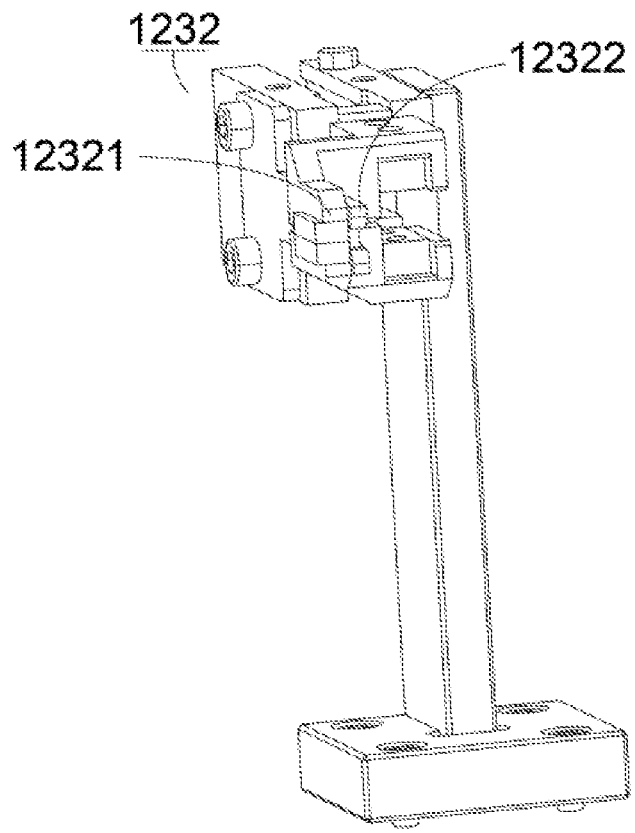
FIG. 8 is a spatial structural schematic diagram of a scion clamping assembly provided by the present disclosure.
Figure 13:
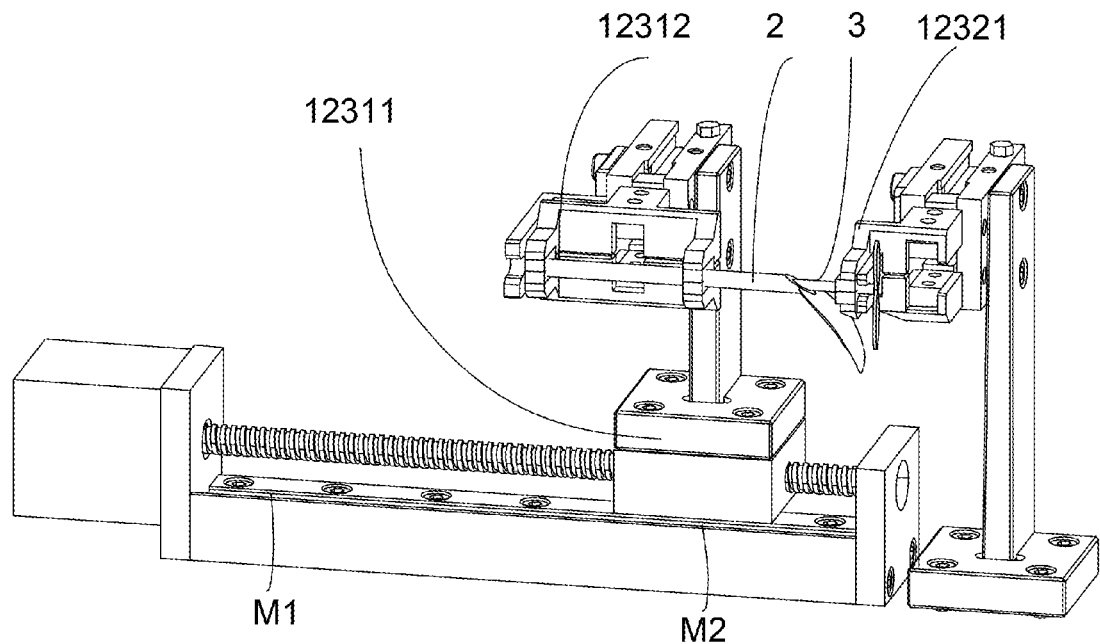
FIG. 13 is a spatial structural schematic diagram of the rootstock and the scion after being butted provided by the present disclosure.

In some embodiments, as shown in FIG. 7, FIG. 8 and FIG. 13, the transfer unit 123 in the embodiment includes a rootstock clamping assembly 1231 and a scion clamping assembly 1232.

The rootstock clamping assembly 1231 and the scion clamping assembly 1232 are arranged side by side.

The rootstock clamping assembly 1231 moves between a first position M1 and a second position M2.

Under the condition that the rootstock clamping assembly 1231 is at the first position M1, the rootstock clamping assembly 1231 gets away from the scion clamping assembly 1232, and the rootstock clamping assembly 1231 and the scion clamping assembly 1232 are respectively matched with the seedling loading mechanism 13 to clamp and fix the rootstock 2 and the scion 3.

Under the condition that the rootstock clamping assembly 1231 is at the second position M2, the rootstock clamping assembly 1231 gets close to the scion clamping assembly 1232 for abutting the rootstock 2 and the scion 3 and clamping the grafted seedling.

The rootstock clamping assembly 1231 includes a linear module 12311, a rootstock clamping jaw 12312 and a rootstock support frame 12313. The rootstock support frame 12313 is arranged on one side of the rootstock clamping jaw 12312. A sliding table of the linear module 12311 is connected with the rootstock clamping jaw 12312. The rootstock clamping jaw 12312 is configured for clamping the rootstock 2. The rootstock support frame 12313 is configured for supporting the rootstock 2. The linear module 12311 is configured for driving the rootstock clamping jaw 12312 to move between the first position M1 and the second position M2.

The scion clamping assembly 1232 includes a scion clamping jaw 12321 and a scion support frame 12322.

The scion support frame 12322 is arranged on one side of the scion clamping jaw 12321, the scion clamping jaw 12321 is configured for clamping the scion 3, and the scion support frame 12322 is used for supporting the scion 3.

Wherein, the rootstock clamping jaw 12312 and the rootstock support frame 12313 are arranged at the same height, and the scion clamping jaw 12321 and the scion support frame 12322 are arranged at the same height.

It can be understood that the rootstock clamping assembly 1231 is configured for clamping the rootstock 2, and the scion clamping assembly 1232 is configured for clamping the scion 3.

The rootstock clamping jaw 12312 includes a rootstock clamping jaw cylinder and two first clamping blocks. The two first clamping blocks are arranged at both ends of the rootstock clamping jaw cylinder in parallel to form two clamping points for the rootstock 2. The scion clamping jaw 12321 includes a scion clamping jaw cylinder and two second clamping blocks. The two second clamping blocks are arranged at both ends of the scion clamping jaw cylinder in parallel to form a clamping point for the scion 3.

The rootstock clamping jaw cylinder may be a finger-type cylinder, and the scion clamping jaw cylinder may be a finger-type cylinder. The linear module 12311 may be any one of a synchronous belt type linear module, a ball screw type linear module and a linear motor type linear module.

Specifically, the motor adopted in the embodiment may be a stepping motor, and also may be a servo motor.

When the rootstock clamping assembly 1231 is at the first position M1, the transfer unit 123 is at the seedling loading station P1. The rootstock clamping assembly 1231 gets away from the scion clamping assembly 1232. The interval between the rootstock clamping assembly 1231 and the scion clamping assembly 1232 may accommodate the seedling loading mechanism 13. The seedling loading mechanism 13 bears a front end of the rootstock 2, the rootstock support frame 12313 bears a rear end of the rootstock 2, the rootstock clamping jaw 12312 bears a middle end of the rootstock 2, and the rootstock clamping jaw cylinder drives the two first clamping blocks to clamp the rootstock 2. The seedling loading mechanism 13 bears a rear end of the scion 3, the scion support frame 12322 bears a front end of the scion 3, the scion clamping jaw 12321 bears a middle end of the scion 3, and the scion clamping jaw cylinder drives the two first clamping blocks to clamp the scion 3. The rootstock 2 and the scion 3 are coaxially and horizontally clamped to complete positioning preparation before cutting operation on the rootstock 2 and the scion 3.

When the rootstock clamping assembly 1231 is at the second position M2, the transfer unit 123 is at the adhesive spraying station P2. The rootstock clamping assembly 1231 gets close to the scion clamping assembly 1232. With the approaching of the rootstock clamping assembly 1231 and the scion clamping assembly 1232, the abutting operation of the cut rootstock 2 and scion 3 is completed.

In the embodiment, the transfer unit 123 is provided with the rootstock clamping assembly 1231 and the scion clamping assembly 1232, and the rootstock clamping assembly 1231 can get close to and away from the scion clamping assembly 1232, so that when the rootstock clamping assembly 1231 gets away from the scion clamping assembly 1232, the rootstock clamping assembly 1231 can bear the rootstock 2 together with the seedling loading mechanism 13 and clamp the rootstock 2. The scion clamping assembly 1232 can bear the scion 3 together with the seeding mechanism 13 and clamp the scion 3. The rootstock 2 and the scion 3 are horizontally and coaxially clamped and positioned, so that subsequent cutting operation is facilitated. Moreover, when the rootstock clamping assembly 1231 gets close to the scion clamping assembly 1232, the abutting operation of the rootstock 2 and the scion 3 is automatically completed without manual adjustment of the abutting height and the abutting angle, so that the abutting efficiency of the rootstock 2 and the scion 3 is improved.

In some embodiments, as shown in FIG. 3, FIG. 9, FIG. 12 and FIG. 13, the seedling loading mechanism 13 in the embodiment includes a hanger frame 131, a cross plate 132 and a first telescopic driving member 133.

The hanger frame 131 is arranged on the workbench 11. The first telescopic driving member 133 is arranged on the hanger frame 131. An output end of the first telescopic driving member 133 is connected with the cross plate 132 to drive the cross plate 132 to reciprocate along the horizontal direction.

Both ends of the cross plate 132 along the horizontal direction are provided with a first auxiliary cutting block 1321 and a second auxiliary cutting block 1322, respectively.

A first groove 13211 is formed in one end, facing the outer side of the workbench 11, of the first auxiliary cutting block 1321, the first groove 13211 extends along the horizontal direction, and the first groove 13211 is configured for accommodating the rootstock 2. A first feed slot 13212 is further formed in the first auxiliary cutting block 1321, the first feed slot 13212 is arranged obliquely, the first feed slot 13212 penetrates a top surface of the first auxiliary cutting block 1321 and a side surface of the first auxiliary cutting block 1321 and penetrates the first groove 13211. The first feed slot 13212 is configured for guiding a cutter of the cutting mechanism 14 to cut the rootstock.

A second groove 13221 is formed in one end, facing the outer side of the workbench 11, of the second auxiliary cutting block 1322, the second groove 13221 extends along the horizontal direction, and the second groove 13221 is configured for accommodating the scion 3. A second feed slot 13222 is further formed in the second auxiliary cutting block 1322, the second feed slot 13222 is arranged obliquely, the second feed slot 13222 penetrates a top surface and a side surface of the second auxiliary cutting block 1322 and penetrates the second groove 13221. The second feed slot 13222 is configured for guiding a cutter of the cutting mechanism 14 to cut the scion 3.

It can be understood that the workbench 11 in the embodiment is provided with a fixed mount 111. The fixed mount 111 extends along the extension direction of the seedling loading station P1. The hanger frame 131 of the seedling loading mechanism 13 is detachably connected with the fixed mount 111, so that the seedling loading mechanism 13 is maintained and exchanged quickly. The hanger 131 in the embodiment is connected with the fixed mount 111 through fasteners.

When the rootstock 2 and the scion 3 are clamped and cut at the seedling loading station P1, the first telescopic driving member 133 drives the cross plate 132 to extend out of the hanger frame 131 towards the outer side of the workbench 11 along the horizontal direction. The first auxiliary cutting block 1321 and the second auxiliary cutting block 1322 on the cross plate 132 are flush with the rootstock clamping assembly 1231 and the scion clamping assembly 1232 to ensure that the rootstock 2 and the scion 3 are clamped by the rootstock clamping jaw 12312 and the scion clamping jaw 12321, respectively. After the cutting operations of the rootstock 2 and the scion 3 are completed, before the transfer unit 123 rotates to the adhesive spraying station P2, the first telescopic driving member 133 drives the cross plate 132 to retract along the horizontal direction to avoid from interfering with the transfer unit 123 and hindering the rotation of the transfer unit 123.

The first telescopic driving member 133 may be a cylinder with three guide bars, and the driving stability of the cross plate 132 is higher based on the transmission of the three guide bars.

For different specifications of rootstocks 2 and scions 3, the structures of the first auxiliary cutting block 1321 and the second auxiliary cutting block 1322 are also different, so the specifications of the first groove 13211 and the second groove 13221 are also different. The first auxiliary cutting block 1321 and the second auxiliary cutting block 1322 in the embodiment are detachably connected with the cross plate 132, so that different specifications of first auxiliary cutting blocks 1321 and second auxiliary cutting blocks 1322 are selected according to the different specifications of rootstocks 2 and scions 3, and the universality of the seedling loading mechanism 13 for the grafting operation of different rootstocks 2 and scions 3 is improved.

Specifically, the first auxiliary cutting block 1321 and the second auxiliary cutting block 1322 in the embodiment are connected with the cross plate 132 through fasteners.

When the rootstock 2 and the scion 3 are cut by the cutters, the first feed slot 13212 and the second feed slot 13222 can define the cutting paths of the cutters to guide the cutters to complete the cutting along the paths of the first feed slot 13212 and the second feed slot 13222, so that the cutting accuracy and cutting quality of the rootstock 2 and the scion 3 are ensured. At the same time, the inclination angle of the first feed slot 13212 and the inclination angle of the second feed slot 13222 are the same, so that the incision of the rootstock 2 and the incision of the scion 3 can be closely laminated during abutting operation, the coincidence degree of the incision of the rootstock 2 and the incision of the scion 3 is improved, and the survival rate of the grafted seedling is ensured.

Specifically, the inclination angle of the first feed slot 13212 and the inclination angle of the second feed slot 13222 range from 20° to 45°, and the inclination angle may be 20°, may also be 32°, and may also be 45°. The adjustment for the inclination angle of the first feed slot 13212 and the inclination angle of the second feed slot 13222 can be realized by replacing the first auxiliary cutting block 1321 and the second auxiliary cutting block 1322 with different angles.

Figure 9:
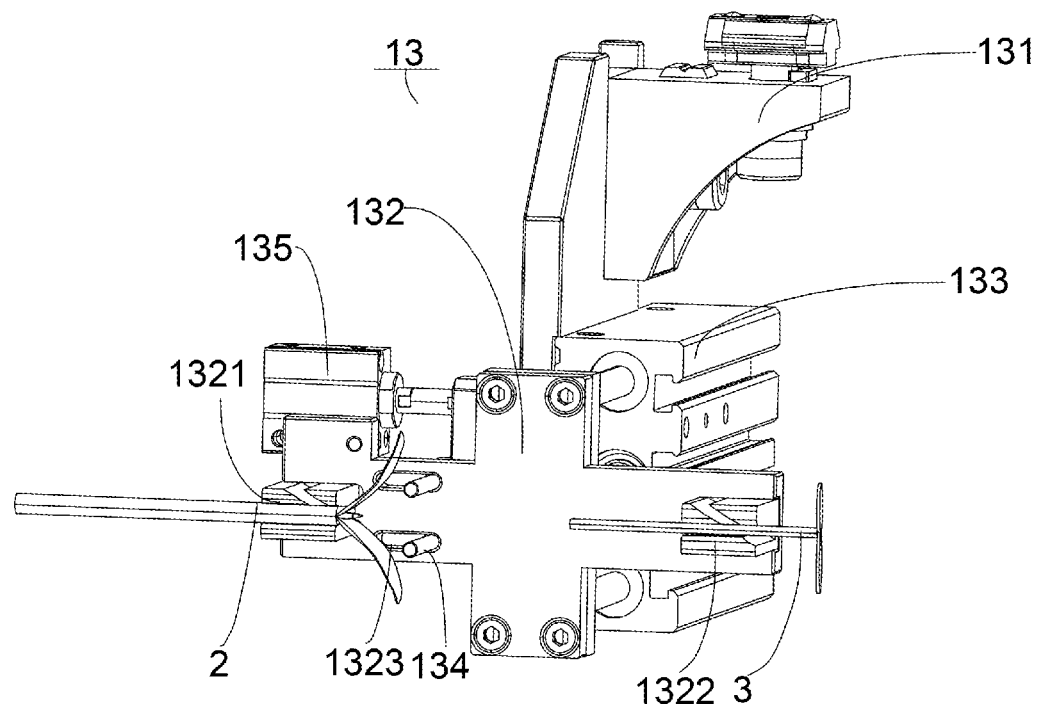
FIG. 9 is a spatial structural schematic diagram of a seedling loading mechanism provided by the present disclosure.
Figure 10:
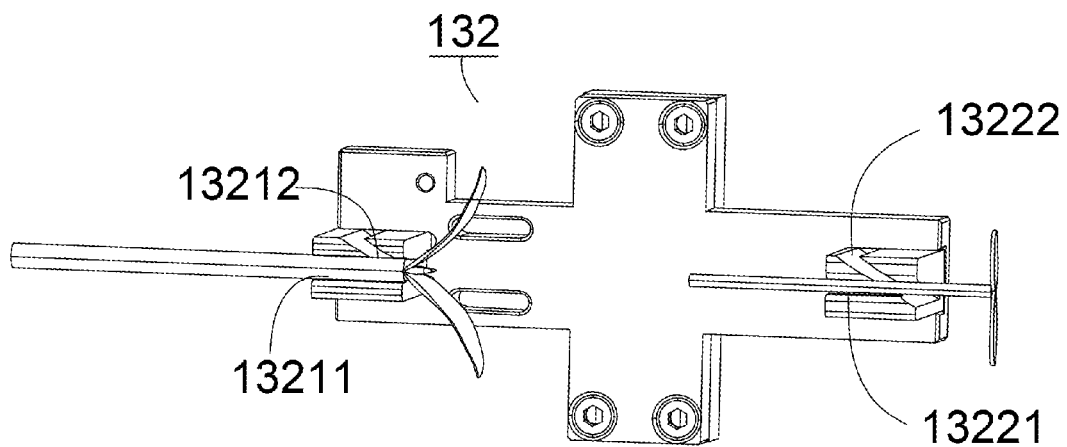
FIG. 10 is a spatial structural schematic diagram of a cross plate provided by the present disclosure.

In some embodiments, as shown in FIG. 9 and FIG. 10, the seedling loading mechanism 13 in the embodiment further includes seedling pressure rods 134 and a second telescopic driving member 135.

Strip holes 1323 are formed in one end, close to the first auxiliary cutting block 1321, of the cross plate 132. The strip holes 1323 extend along the horizontal direction. Each of the seedling pressure rods 134 penetrates a corresponding one of the strip holes 1323. The second telescopic driving member 135 is arranged on the cross plate 132. An output end of the second telescopic driving member 135 is connected with the seedling pressure rods 134 to drive the seedling pressure rods 134 to move along the strip holes 1323. The seedling pressure rod 134 is configured for making contact with or being separated from petioles of the rootstock 2 and can assist the cutting mechanism 14 to complete cutting operation.

It can be understood that, due to the difference in the external morphology between the rootstock 2 and the scion 3 of melons, the cutting requirement for the rootstock 2 is to cut off a cotyledon and a growing point to form an incision. When the rootstock 2 is loaded with the seedling, it is necessary to adjust the horizontal position of the rootstock 2 in the first groove 13211 in the first auxiliary cutting block 1321, so that the intersection point of the two cotyledons coincides with the edge of one side, close to the seedling pressure rod 134, of the first auxiliary cutting block 1321 to ensure that the trajectory of the cutter can pass through the intersection point of the two cotyledons and the centers of the first feed slot 13212 of the first auxiliary cutting block 1321.

Two seedling pressure rods 134 in the embodiment are provided, and the two seedling pressure rods 134 are arranged at parallel intervals. The two seedling pressure rods 134 can press down the petioles of the two cotyledons of the rootstock 2, so that the cutting of the cotyledons and the growing points of the rootstock 2 is completed by the cutter.

The cross plate 132 in the embodiment is provided with two strip holes 1323. The two strip holes 1323 are extended along the horizontal direction of the cross plate 132. The two seedling pressure rods 134 penetrate the two strip holes 1323. The second telescopic driving member 135 drives the two seedling pressure rods 134 to move along the strip holes 1323 toward the rootstock 2 to press the cotyledons of the rootstock 2. It is ensured that the cutter can cut off a cotyledon and a growing point during cutting. Since the seedling pressure rods 134 move along the horizontal direction under the guidance of the strip holes 1323, the moving stability of the seedling pressure rods 134 is facilitated.

The second telescopic driving member 135 may be any one of an electric push rod, a linear motor and a cylinder.

Figure 11:
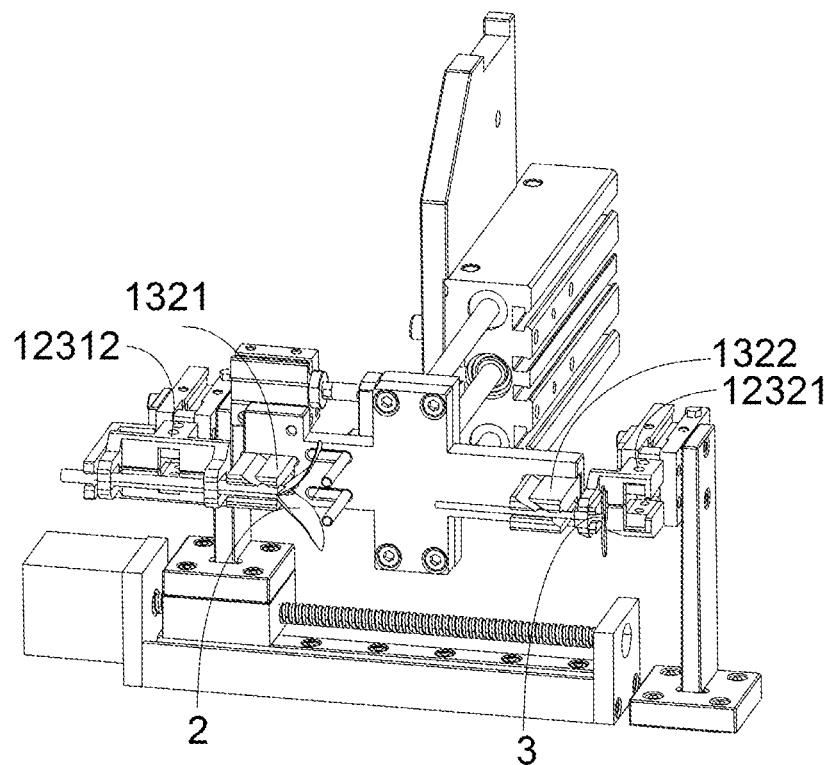
FIG. 11 is a spatial structural schematic diagram of a rootstock and a scion before being cut provided by the present disclosure.
Figure 12:
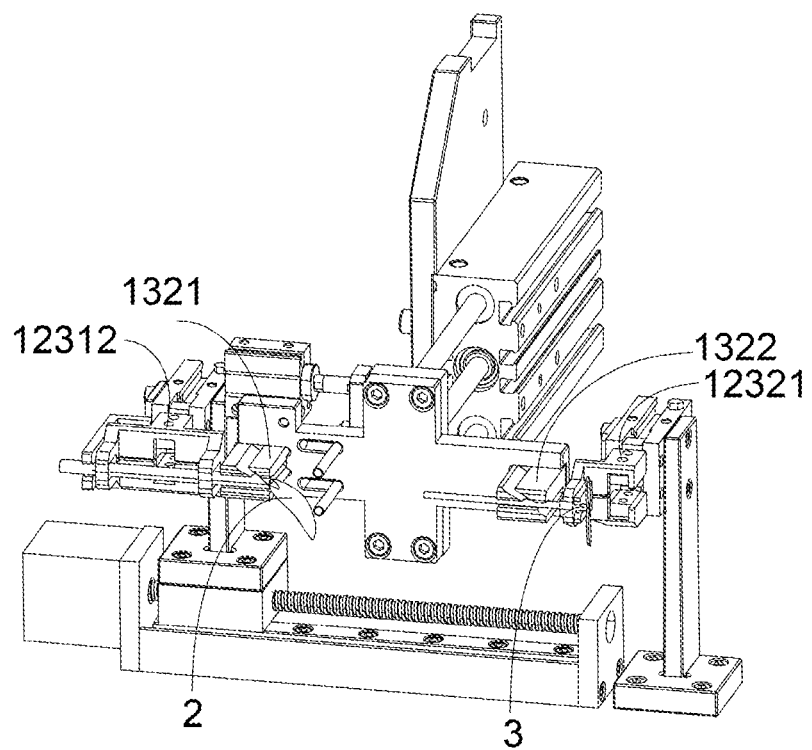
FIG. 12 is a spatial structural schematic diagram of the rootstock and the scion after being cut provided by the present disclosure.
Figure 14:
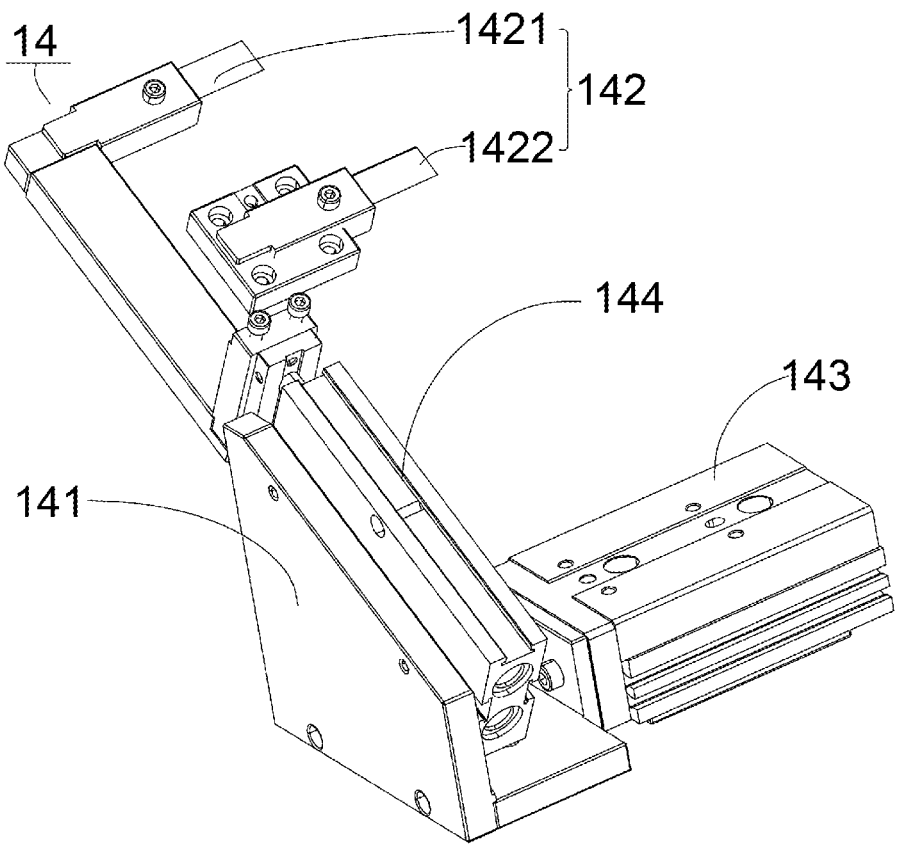
FIG. 14 is a spatial structural schematic diagram of a cutting mechanism provided by the present disclosure.

In some embodiments, as shown in FIG. 11, FIG. 12 and FIG. 14, the cutting mechanism 14 in the embodiment includes a transfer seat 141, a cutter rest 142, a third telescopic driving member 143 and a fourth telescopic driving member 144.

The third telescopic driving member 143 is arranged on the workbench 11, and an output end of the third telescopic driving member 143 is connected with the transfer seat 141 to drive the transfer seat 141 to reciprocate along the horizontal direction.

The fourth telescopic driving member 144 is arranged on the transfer seat 141, an output end of the fourth telescopic driving member 144 is connected with the cutter rest 142, and the telescopic direction of the fourth telescopic driving member 144 is arranged obliquely relative to the horizontal plane to drive the cutter rest 142 to cut the rootstock 2 and the scion 3.

The cutter rest 142 rest is provided with a rootstock cutter 1421 and a scion cutter 1422. The rootstock cutter 1421 and the scion cutter 1422 are arranged in parallel, the rootstock cutter 1421 is adapted to the inclination angle of the first feed slot 13212, and the inclination angle of the scion cutter 1422 is adapted to the inclination angle of the second feed slot 13222.

It can be understood that, when the cutter rest 142 cuts the rootstock 2 and the scion 3, the third telescopic driving member 143 drives the transfer seat 141 and the cutter rest 142 to get close to the seedling loading mechanism 13, and the fourth telescopic driving 144 drives the cutter rest 142 to move along the oblique direction, so that the rootstock cutter 1421 respectively cuts the rootstock 2 and the scion 3 under the guidance of the first feed slot 13212 and the guidance of the second feed slot 13222. Then, the third telescopic driving member 143 drives the transfer seat 141 and the cutter rest 142 to get away from the seedling loading mechanism 13 to avoid from interfering with the rotation of the transfer unit 123.

The inclination angle of the rootstock cutter 1421 and the inclination angle of the scion cutter 1422 are the same, so that the angles of the incisions of the rootstock 2 and the scion 3 are the same, which facilitate close contact between the rootstock 2 and the scion 3 when the rootstock 2 and the scion 3 are butted. The incisions are not exposed to the air, and the wound infection of the grafted seedling is avoided, so that the survival rate of the grafted seedling is improved. Moreover, the rootstock cutter 1421 and the scion cutter 1422 are installed on the same cutter rest 142. The rootstock cutter 1421 and the scion cutter 1422 are synchronously driven by the fourth driving member to carry out cutting operation, so that the abutting lamination accuracy of the incision of the rootstock 2 and the incision of the scion 3 is improved.

At the same time, the inclination angle of the rootstock cutter 1421 is adapted to the inclination angle of the first feed slot 13212, and the inclination angle of the scion cutter 1422 is adapted to the inclination angle of the second feed slot 13222, which facilitate the rootstock cutter 1421 to cut the rootstock 2 through the first feed slot 13212, and the scion cutter 1422 to cut the scion 3 through the second feed slot 13222, so that the cutting stability for the rootstock 2 and the scion 3 is improved.

Specifically, the inclination angle of the rootstock cutter 1421 and the inclination angle of the scion cutter 1422 range from 20° to 45°, and the inclination angle may be 20°, may also be 32°, and may also be 45°. The adjustments for the inclination angle of the scion cutter 1421 and the inclination angle of the scion cutter 1422 can be realized by replacing the cutter rest 142.

The third telescopic driving member 143 may be any one of an electric push rod, a linear motor and a cylinder. The fourth telescopic driving member 144 may be any one of an electric push rod, a linear motor and a cylinder.

Specifically, the center distance between the first auxiliary cutting block 1321 and the second auxiliary cutting block 1322 is equal to that between the rootstock cutter 1421 and the scion cutter 1422, and also equal to the abutting movement distance of the rootstock clamping assembly 1231 from the first position M1 to the second position M2, so that the accuracy when the rootstock 2 and the scion 3 are cut and butted is ensured.

In the embodiment, the third telescopic driving member 143 and the fourth telescopic driving member 144 are arranged, so that the cutter rest 142 is driven to get close to or away from the seedling loading mechanism 13 through the third telescopic driving member 143, and the cutter rest 142 gets close to the rootstock 2 and the scion 3 for cutting operation, or the cutter rest 142 gets away from the rootstock 2 and the scion 3 to avoid rotating interference with the transfer unit 123. In addition, the fourth telescopic driving member 144 drives the cutter rest 142 to move along the oblique direction, so that the rootstock 2 and the scion 3 can be cut synchronously at a fixed angle, the butt coincidence degree of the incision of the rootstock 2 and the incision of the scion 3 is ensured, and the butt accuracy and grafting quality are improved.

Figure 15:
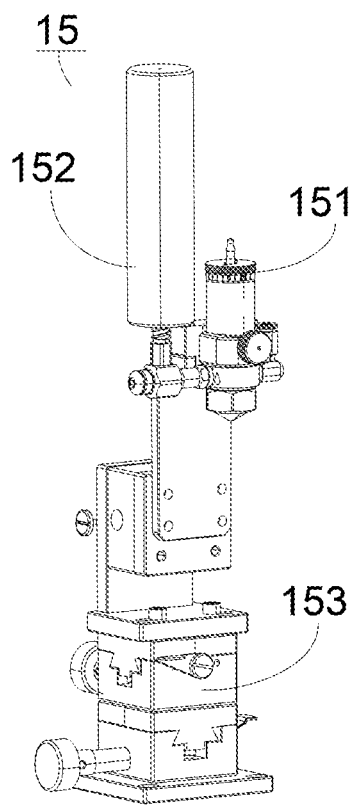
FIG. 15 is a spatial structural schematic diagram of an adhesive spraying mechanism provided by the present disclosure.

In some embodiments, as shown in FIG. 3 and FIG. 15, the adhesive spraying mechanism 15 in the embodiment includes a spray valve 151, an adhesive storage tank 152 and a displacement platform 153.

The displacement platform 153 is arranged on the workbench 11, the spray valve 151 and the adhesive storage tank 152 are arranged on the displacement platform 153, and the spray valve 151 communicates with the adhesive storage tank 152.

The spray valve is 151 configured for spraying UV adhesive on the periphery of the joint portion of the rootstock 2 and the scion 3.

It can be understood that the displacement platform 153 can realize the adjustment for the output end relative to the x, y and z directions of the workbench 11 through the cooperation of a gear set, so that the adjustment for an adhesive spray valve relative to three directions of the grafted seedling can be conveniently realized, and the applicability to different specifications of grafted seedlings is improved.

Optionally, the displacement platform 153 can be manually controlled, and can also be electrically or pneumatically controlled.

The adhesive storage tank 152 is stored with UV adhesive, and the UV adhesive is atomized through a nozzle of the spray valve 151. An outer surface of the grafted seedling is sprayed. The UV adhesive wraps or semi-wraps the butt laminated portion of the incision to form an adhesive film on the outer surface of the grafted seedling.

Compared with applying the plastic clip to fix the grafted seedling, the adhesive film of UV adhesive can be formed instantly, and the adhesive film is more flexible for fixing the incision. The flexible adhesive film does not cause high-strength extrusion on the grafted seedling, and the adhesive film can automatically fall off at the later stage of grafted seedling healing without manual intervention, so that the efficiency for fixing the grafted seedling is improved. In addition, medical-grade UV adhesive can work safely on plants, production and planting environments, which is beneficial to environmental protection, and compared with the plastic clip, the UV adhesive is lower in cost and higher in economic value.

Figure 16:
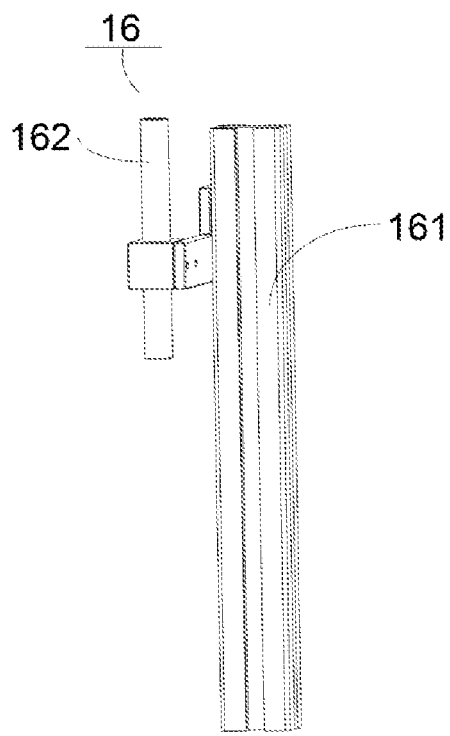
FIG. 16 is a spatial structural schematic diagram of a curing mechanism provided by the present disclosure.

In some embodiments, as shown in FIG. 3 and FIG. 16, the curing mechanism 16 in the embodiment includes a support 161 and a UV light source 162.

The support 161 is arranged on the workbench 11, the UV light source 162 is arranged on the support 161, and the UV light source 162 irradiates the UV adhesive through ultra-violet rays to realize the curing of the UV adhesive.

It can be understood that, under the irradiation of an ultraviolet lamp, the UV adhesive can be cured instantly, so that the adhesive film formed on the outer surface of the grafted seedling forms a stable whole body, and the grafted seedling is wrapped in the adhesive film, and flexible fixation for the grafted seedling is realized.

Specifically, the UV light source 162 in the embodiment is an LED (Light Emitting Diode) UV light source with a wave length of 365 nm.

In the embodiment, by adopting the UV light source 162, the UV adhesive sprayed on the outer surface of the grafted seedling can be instantly cured to form a stable whole body with the grafted seedling, so that the fixing efficiency and fixing quality of the grafted seedling are improved.

Figure 17:
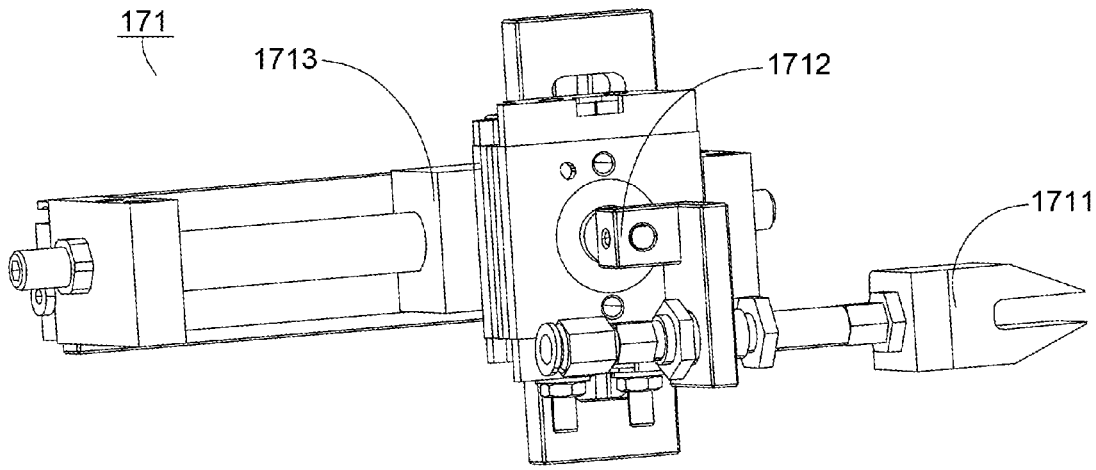
FIG. 17 is a spatial structural schematic diagram of a clamping assembly provided by the present disclosure.

In some embodiments, as shown in FIG. 3 and FIG. 17, the seedling unloading mechanism 17 in the embodiment includes a clamping assembly 171 and a belt conveying assembly 172.

The clamping assembly 171 includes a flexible seedling clamping jaw 1711, a rotation driving member 1712 and a fifth telescopic driving member 1713.

The fifth telescopic driving member 1713 is arranged on the workbench 11, an output end of the fifth telescopic driving member 1713 is connected with the rotation driving member 1712, and an output end of the rotation driving member 1712 is connected with the flexible seedling clamping jaw 1711.

The fifth telescopic driving member 1713 is configured for driving the rotation driving member 1712 to reciprocate in the horizontal direction, and the rotation driving member is 1712 configured for driving the flexible seedling clamping jaw 1711 to switch between a first state and a second state.

Under the condition that the flexible seedling clamping jaw 1711 is at the first state, the flexible seedling clamping jaw 1711 is arranged along the horizontal direction.

Under the condition that the flexible seedling clamping jaw 1711 is at the second state, the flexible seedling clamping jaw 1711 is arranged along the vertical direction.

It can be understood that the fifth telescopic driving member 1713 is arranged on the fixed mount 111.

The flexible seedling clamping jaw 1711 may be made of silica gel. The flexible seedling clamping jaw 1711 may be inflated or deflated. When inflated, the flexible seedling clamping jaw 1711 may flexibly clamp the grafted seedling. When deflated, the grafted seedling is released. The flexible seedling clamping jaw 1711 may transfer the grafted seedling to the belt conveying assembly 172. A flexible clamping function of the flexible seedling clamping jaw 1711 does no harm to the grafted seedling, so that the growth of the grafted seedling after transplantation is facilitated, and the survival rate of the grafted seedling is improved. Moreover, the grafted seedling is automatically clamped and released, so that the manual labor intensity is reduced, the work efficiency is improved, and the cost is saved.

After the UV adhesive sprayed on the outer surface of the grafted seedling is cured, the transfer mechanism 12 transports the grafted seedling to the seedling unloading station P4. At this time, the flexible seedling clamping jaw 1711 is parallel to the horizontal direction for clamping the grafted seedling. Then, the rotation driving 1712 drives the flexible seedling clamping jaw 1711 to rotate from the horizontal direction to the vertical direction. At the same time, the fifth telescopic driving member 1713 drives the flexible seedling clamping jaw 1711 to move along the horizontal direction to adjust the position of the flexible seedling clamping jaw 1711 relative to the belt conveying assembly 172 and ensure that when the grafted seedling is released by the flexible seedling clamping jaw 1711, the grafted seedling can accurately fall on the belt conveying assembly 172 and be conveyed to the next station.

The fifth telescopic driving member 1713 may be any one of an electric push rod, a linear motor and a cylinder. The rotation driving member 1712 may be a motor.

In some embodiments, as shown in FIG. 3, the embodiment further includes a seedling loading disc 18.

The seedling loading disc 18 is arranged on the outer side of the workbench 11 close to the seedling loading station P1. Two seedling loading discs 18 in the embodiment are provided. The two seedling loading discs 18 are arranged at interval. The seedling loading discs 18 are used for placing the rootstock 2 and the scion 3 to be grafted.

In some embodiments, as shown in FIG. 3 and FIG. 18, when the rootstock 2 and the scion 3 are grafted by the grafting device 1, firstly, at the seedling loading station P1, the control center 19 controls the first telescopic driving member 133 to extend, and drives the cross plate 132 to extend between the rootstock clamping assembly 1231 and the scion clamping assembly 1232. The rootstock 2 and the scion 3 on the cross plate 132 are synchronously born by the rootstock clamping assembly 1231 and the scion clamping assembly 1232, and the control center 19 controls the rootstock clamping jaw 12312 to clamp the rootstock and the scion clamping jaw 12321 to clamp the scion 3. The control center 19 controls the second telescopic driving member 135 to drive the seedling pressure rod 134 to press down the cotyledonal petioles of the rootstock 2.

Then, the third telescopic driving member 143 drives the transfer seat 141 of the cutting mechanism 14 to get close to the transfer unit 123, and the fourth telescopic driving member 144 drives the rootstock cutter 1421 and the scion cutter 1422 to cut the rootstock 2 and the scion 3 synchronously. After the cutting for the rootstock 2 and the scion 3 are completed, the third telescopic driving member 143 drives the transfer seat 141 of the cutting mechanism 14 to get away from the transfer unit 123. At the same time, the first telescopic driving member 133 drives the cross plate 132 to retract, so that the cross plate 132 gets away from the transfer unit 123.

Then, the control center 19 controls the swing driving assembly 121 to drive the rotating platform 122 to rotate clockwise, and transports the transfer unit 123 that has finished the cutting operation to the adhesive spraying station P2. The control center 19 controls the linear module 12311 to drive the rootstock clamping jaw 12312 to get close to the scion clamping jaw 12321 to complete the abutting operation of the rootstock 2 and the scion 3, and the control center 19 controls the spray valve 151 to spray UV adhesive on the grafted seedling.

Then, the control center 19 controls the swing driving assembly 121 to drive the rotating platform 122 to rotate clockwise, and transports the transfer unit that has completed the adhesive spraying operation to the curing station P3, and the control center 19 controls the UV light source 162 to cure the grafted seedling.

Finally, the control center 19 controls the swing driving assembly 121 to drive the rotating platform 122 to rotate clockwise, and transports the transfer unit 123 that has completed the curing operation to the seedling unloading station P4. The control center 19 controls the fifth telescopic driving member 1713 to adjust the horizontal position, and controls the ventilation to the flexible seedling clamping jaw 1711, so that the grafted seedling is clamped by the flexible seedling clamping jaw 1711. At the same time, the rootstock clamping jaw 12312 and the scion clamping jaw 12321 are controlled to release the grafted seedling, and the grafted seedling moves to the flexible clamping jaw 1711. The control center 19 controls the rotation driving member 1712 to drive the flexible clamping jaw 1711 to rotate from the horizontal position to the vertical position, and controls gas in the flexible clamping jaw 1711 to release the grafted seedling. The grafted seedling is released by the flexible clamping jaw 1711, and the grafted seedling is transferred to the belt conveying assembly 172. The belt conveying assembly 172 is controlled to convey the grafted seedling to the next station.

Figure 19:
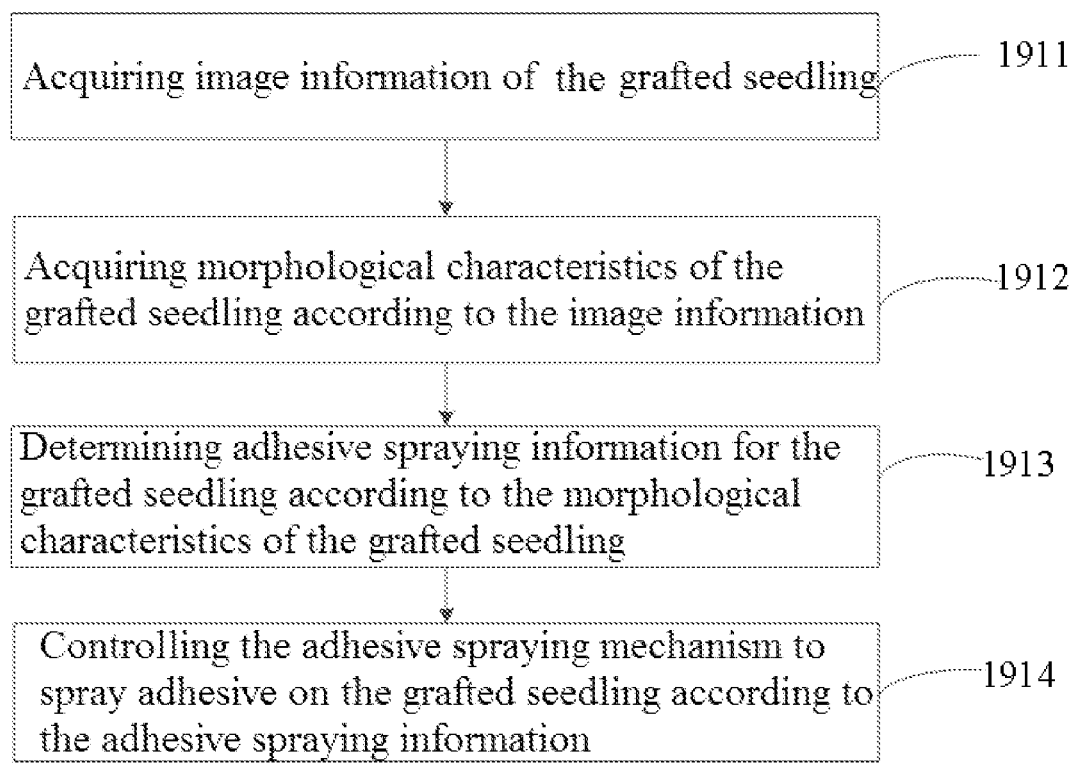
FIG. 19 is a flow diagram of a grafting method based on the grafting device provided by the present disclosure.

In a second aspect, in some embodiments, as shown in FIG. 19, the embodiment provides a grafting method of a grafting device 1 based on UV adhesive, including the following steps.

Before adhesive spraying is carried out on the grafted seedling, the controller first controls the seedling loading mechanism and the transfer unit to clamp the rootstock and the scion, then controls the oblique cutting mechanism to cut the rootstock and scion, then controls the transfer unit to transfer the rootstock and the scion to the adhesive spraying station, and controls the transfer unit to butt the rootstock and the scion to form the grafted seedling.

In step 1911, the image information of the grafted seedling is acquired.

It can be understood that a detection sensor may be installed at the adhesive spraying station. The detection sensor may be a visual detection mechanism or a laser detection mechanism, and the detection sensor is configured for detecting the shape image of the grafted seedling.

In step 1912, the morphological characteristics of the grafted seedling according to the image information are acquired.

It can be understood that, according to the image information of the grafted seedling, the image processing module is configured to process the image of the grafted seedling to obtain the shape dimensions of the grafted seedling.

In step 1913, the adhesive spraying information for the grafted seedling is determined according to the morphological characteristics of the grafted seedling.

It can be understood that the flow rates of UV adhesive required by different specifications of grafted seedlings are different, and too much or too little flow rate is not conducive to the fixation and growth quality of the grafted seedling.

For the shape dimensions of the grafted seedling, the flow rate of the UV adhesive needing to be sprayed is quickly determined, and the spraying time required for the grafted seedling is calculated according to the spraying speed of the spray valve.

In step 1914, the adhesive spraying mechanism is controlled to carry out adhesive spraying on the grafted seedling according to the adhesive spraying information.

It can be understood that the control center performs the adhesive spraying operation on the grafted seedling according to the acquired spraying time.

Different spraying time is used for different specifications of grafted seedlings in the embodiment, the grafted seedling can be completely sprayed to form the adhesive film, so a fixed mass is ensured. At the same time, the waste of UV adhesive due to excessive spraying cannot be caused, so that the universality of the grafting device for different grafted seedlings is improved.

Finally, the transfer unit is controlled to transfer the grafted seedling to the curing unit, the UV light source is controlled to cure the grafted seedling, the transfer unit is controlled to transfer the grafted seedling to the seedling unloading station, and the seedling unloading mechanism is controlled to take down the grafted seedling.

The foregoing embodiments are merely intended to describe the technical solutions of the present disclosure, but not to limit the present disclosure. Although the present disclosure is described in detail with reference to the foregoing embodiments, persons of ordinary skill in the art should understand that they may still make modifications to the technical solutions described in the foregoing embodiments or make equivalent replacements to some technical features thereof, without departing from the spirit and scope of the technical solutions of the embodiments of the present disclosure.

What is claimed is:

1. A grafting device based on UV (Ultraviolet Rays) adhesive, comprising a workbench, a transfer mechanism, a seedling loading mechanism, a cutting mechanism, an adhesive spraying mechanism, a curing mechanism and a seedling unloading mechanism, wherein the transfer mechanism, the seedling loading mechanism, the cutting mechanism, the adhesive spraying mechanism, the curing mechanism and the seedling unloading mechanism are sequentially arranged on the workbench;

a seedling loading station, an adhesive spraying station, a curing station and a seedling unloading station are arranged in turn along a circumferential direction of the transfer mechanism;

the seedling loading mechanism and the cutting mechanism are arranged at the seedling loading station; the adhesive spraying mechanism is arranged at the adhesive spraying station; the curing mechanism is arranged at the curing station; the seedling unloading mechanism is arranged at the seedling unloading station;

at the seedling loading station, the seedling loading mechanism is configured for bearing a rootstock and a scion, the transfer mechanism is configured for receiving and fixing the rootstock and the scion, and the cutting mechanism is configured for cutting the rootstock and the scion;

the transfer mechanism is configured for moving the rootstock and the scion located at the seedling loading station to the adhesive spraying station, and abutting the rootstock against the scion to obtain a grafted seedling;

at the adhesive spraying station, the adhesive spraying mechanism is provided with a spray valve, and the adhesive spraying mechanism is configured for spraying UV adhesive on a periphery of a joint portion of the rootstock and the scion; the transfer mechanism is configured for transferring the grafted seedling located at the adhesive spraying station to the curing station;

at the curing station, the curing mechanism is configured for curing the UV adhesive sprayed on the grafted seedling; the transfer mechanism is configured for transferring the grafted seedling located at the curing station to the seedling unloading station;

at the seedling unloading station, the seedling unloading mechanism is configured for performing a seedling unloading treatment on the grafted seedling;

the transfer mechanism is provided with a plurality of transfer units, and each of the plurality of transfer units comprises a rootstock clamping assembly and a scion clamping assembly;

the rootstock clamping assembly and the scion clamping assembly are arranged side by side;

the rootstock clamping assembly is movable between a first position and a second position;

under a condition that the rootstock clamping assembly is at the first position, the rootstock clamping assembly is configured to get away from the scion clamping assembly, and the rootstock clamping assembly and the scion clamping assembly are configured to be matched with the seedling loading mechanism to clamp and fix the rootstock and the scion; and under a condition that the rootstock clamping assembly is at the second position, the rootstock clamping assembly is configured to get close to the scion clamping assembly for abutting the rootstock against the scion and clamping the grafted seedling.

2. The grafting device based on UV adhesive according to claim 1, wherein the transfer mechanism comprises a swing driving assembly, a rotating platform and the plurality of transfer units;

the swing driving assembly is arranged on the workbench, the rotating platform is arranged on the swing driving assembly, the rotating platform is provided with the plurality of transfer units along a circumferential direction of the rotating platform, and each of the plurality of transfer units is configured for clamping the rootstock and the scion; and each of the plurality of transfer units is able to move to the seedling loading station, the adhesive spraying station, the curing station and the seedling unloading station in turn under driving of the rotating platform.

3. The grafting device based on UV adhesive according to claim 2, wherein the rootstock clamping assembly comprises a linear module, a rootstock clamping jaw and a rootstock support frame; the rootstock support frame is arranged on one side of the rootstock clamping jaw, a sliding table of the linear module is connected with the rootstock clamping jaw, the rootstock clamping jaw is configured for clamping the rootstock, the rootstock support frame is configured for supporting the rootstock, and the linear module is configured for driving the rootstock clamping jaw to move between the first position and the second position;

the scion clamping assembly comprises a scion clamping jaw and a scion support frame;

the scion support frame is arranged on one side of the scion clamping jaw, the scion clamping jaw is configured for clamping the scion, and the scion support frame is configured for supporting the scion;

wherein the rootstock clamping jaw and the rootstock support frame are arranged at a same height, and the scion clamping jaw and the scion support frame are arranged at a same height.

4. The grafting device based on UV adhesive according to claim 1, wherein the seedling loading mechanism comprises a hanger frame, a cross plate and a first telescopic driving member;

the hanger frame is arranged on the workbench, the first telescopic driving member is arranged on the hanger frame, and an output end of the first telescopic driving member is connected with the cross plate to drive the cross plate to reciprocate along a horizontal direction;

both ends of the cross plate along the horizontal direction are provided with a first auxiliary cutting block and a second auxiliary cutting block, respectively;

a first groove is formed in one end, facing an outer side of the workbench, of the first auxiliary cutting block, the first groove extends along the horizontal direction, and the first groove is configured for accommodating the rootstock; a first feed slot is further formed in the first auxiliary cutting block, the first feed slot is arranged obliquely, the first feed slot penetrates a top surface of the first auxiliary cutting block and a side surface of the first auxiliary cutting block and penetrates the first groove; the first feed slot is configured for guiding a first cutter of the cutting mechanism to cut the rootstock;

a second groove is formed in one end, facing the outer side of the workbench, of the second auxiliary cutting block, the second groove extends along the horizontal direction, and the second groove is configured for accommodating the scion; a second feed slot is further formed in the second auxiliary cutting block, the second feed slot is arranged obliquely, the second feed slot penetrates a top surface of the second auxiliary cutting block and a side surface of the second auxiliary cutting block and penetrates the second groove; the second feed slot is configured for guiding a second cutter of the cutting mechanism to cut the scion.

5. The grafting device based on UV adhesive according to claim 4, wherein the seedling loading mechanism further comprises seedling pressure rods and a second telescopic driving member;

strip holes are formed in one end, close to the first auxiliary cutting block, of the cross plate, the strip hole extends along the horizontal direction, each of the seedling pressure rods penetrates a corresponding one of the strip holes, the second telescopic driving member is arranged on the cross plate, an output end of the second telescopic driving member is connected with the seedling pressure rod to drive the seedling pressure rod to move along the corresponding one of the strip holes, and the seedling pressure rods are configured for making contact with or being separated from petioles of the rootstock and are able to assist the cutting mechanism to complete cutting operation.

6. The grafting device based on UV adhesive according to claim 4, wherein the cutting mechanism comprises a transfer seat, a cutter rest, a third telescopic driving member and a fourth telescopic driving member;

the third telescopic driving member is arranged on the workbench, and an output end of the third telescopic driving member is connected with the transfer seat to drive the transfer seat to reciprocate along the horizontal direction;

the fourth telescopic driving member is arranged on the transfer seat, an output end of the fourth telescopic driving member is connected with the cutter rest, and the telescopic direction of the fourth telescopic driving member is arranged obliquely relative to the horizontal plane to drive the cutter rest to cut the rootstock and the scion;

the cutter rest is provided with a rootstock cutter and a scion cutter; the rootstock cutter and the scion cutter are arranged in parallel, an inclination angle of the rootstock cutter is adapted to an inclination angle of the first feed slot, and an inclination angle of the scion cutter is adapted to an inclination angle of the second feed slot.

7. The grafting device based on UV adhesive according to claim 6, wherein the adhesive spraying mechanism comprises the spray valve, an adhesive storage tank and a displacement platform;

the displacement platform is arranged on the workbench, the spray valve and the adhesive storage tank are arranged on the displacement platform, and the spray valve communicates with the adhesive storage tank;

wherein the spray valve is configured for spraying the UV adhesive on the periphery of the joint portion of the rootstock and the scion.

8. The grafting device based on UV adhesive according to claim 7, wherein the curing mechanism comprises a support and a UV light source;

the support is arranged on the workbench, the UV light source is arranged on the support, and the UV light source is configured to irradiate the UV adhesive through ultraviolet rays to cure the UV adhesive.

9. The grafting device based on UV adhesive according to claim 7, wherein the seedling unloading mechanism comprises a clamping assembly and a belt conveying assembly;

the clamping assembly comprises a flexible seedling clamping jaw, a rotation driving member and a fifth telescopic driving member;

the fifth telescopic driving member is arranged on the workbench, an output end of the fifth telescopic driving member is connected with the rotation driving member, and an output end of the rotation driving member is connected with the flexible seedling clamping jaw;

the fifth telescopic driving member is configured for driving the rotation driving member to reciprocate in the horizontal direction, and the rotation driving member is configured for driving the flexible seedling clamping jaw to switch between a first state and a second state;

under a condition that the flexible seedling clamping jaw is at the first state, the flexible seedling clamping jaw is configured to be arranged along the horizontal direction; and under a condition that the flexible seedling clamping jaw is at the second state, the flexible seedling clamping jaw is configured to be arranged along a vertical direction.

10. A grafting method based on the grafting device according to claim 1, comprising:

acquiring image information of the grafted seedling;

acquiring morphological characteristics of the grafted seedling according to the image information;

determining adhesive spraying information for the grafted seedling according to the morphological characteristics of the grafted seedling; and controlling the adhesive spraying mechanism to spray adhesive on the grafted seedling according to the adhesive spraying information.

11. The grafting method based on the grafting device according to claim 10, wherein the transfer mechanism comprises a swing driving assembly, a rotating platform and the plurality of transfer units;

the swing driving assembly is arranged on the workbench, the rotating platform is arranged on the swing driving assembly, the rotating platform is provided with the plurality of transfer units along a circumferential direction of the rotating platform, and each of the plurality of transfer units is configured for clamping the rootstock and the scion; and each of the plurality of transfer units is able to move to the seedling loading station, the adhesive spraying station, the curing station and the seedling unloading station in turn under driving of the rotating platform.

12. The grafting method based on the grafting device according to claim 11, wherein the rootstock clamping assembly comprises a linear module, a rootstock clamping jaw and a rootstock support frame; the rootstock support frame is arranged on one side of the rootstock clamping jaw, a sliding table of the linear module is connected with the rootstock clamping jaw, the rootstock clamping jaw is configured for clamping the rootstock, the rootstock support frame is configured for supporting the rootstock, and the linear module is configured for driving the rootstock clamping jaw to move between the first position and the second position;

the scion clamping assembly comprises a scion clamping jaw and a scion support frame;

the scion support frame is arranged on one side of the scion clamping jaw, the scion clamping jaw is configured for clamping the scion, and the scion support frame is configured for supporting the scion;

wherein the rootstock clamping jaw and the rootstock support frame are arranged at a same height, and the scion clamping jaw and the scion support frame are arranged at a same height.

13. The grafting method based on the grafting device according to claim 10, wherein the seedling loading mechanism comprises a hanger frame, a cross plate and a first telescopic driving member;

the hanger frame is arranged on the workbench, the first telescopic driving member is arranged on the hanger frame, and an output end of the first telescopic driving member is connected with the cross plate to drive the cross plate to reciprocate along a horizontal direction;

both ends of the cross plate along the horizontal direction are provided with a first auxiliary cutting block and a second auxiliary cutting block, respectively;

a first groove is formed in one end, facing an outer side of the workbench, of the first auxiliary cutting block, the first groove extends along the horizontal direction, and the first groove is configured for accommodating the rootstock; a first feed slot is further formed in the first auxiliary cutting block, the first feed slot is arranged obliquely, the first feed slot penetrates a top surface of the first auxiliary cutting block and a side surface of the first auxiliary cutting block and penetrates the first groove; the first feed slot is configured for guiding a first cutter of the cutting mechanism to cut the rootstock;

a second groove is formed in one end, facing the outer side of the workbench, of the second auxiliary cutting block, the second groove extends along the horizontal direction, and the second groove is configured for accommodating the scion; a second feed slot is further formed in the second auxiliary cutting block, the second feed slot is arranged obliquely, the second feed slot penetrates a top surface of the second auxiliary cutting block and a side surface of the second auxiliary cutting block and penetrates the second groove; the second feed slot is configured for guiding a second cutter of the cutting mechanism to cut the scion.

14. The grafting method based on the grafting device according to claim 13, wherein the seedling loading mechanism further comprises seedling pressure rods and a second telescopic driving member;

strip holes are formed in one end, close to the first auxiliary cutting block, of the cross plate, the strip hole extends along the horizontal direction, each of the seedling pressure rods penetrates a corresponding one of the strip holes, the second telescopic driving member is arranged on the cross plate, an output end of the second telescopic driving member is connected with the seedling pressure rod to drive the seedling pressure rod to move along the corresponding one of the strip holes, and the seedling pressure rods are configured for making contact with or being separated from petioles of the rootstock and are able to assist the cutting mechanism to complete cutting operation.

15. The grafting method based on the grafting device according to claim 13, wherein the cutting mechanism comprises a transfer seat, a cutter rest, a third telescopic driving member and a fourth telescopic driving member;

the third telescopic driving member is arranged on the workbench, and an output end of the third telescopic driving member is connected with the transfer seat to drive the transfer seat to reciprocate along the horizontal direction;

the fourth telescopic driving member is arranged on the transfer seat, an output end of the fourth telescopic driving member is connected with the cutter rest, and the telescopic direction of the fourth telescopic driving member is arranged obliquely relative to the horizontal plane to drive the cutter rest to cut the rootstock and the scion;

the cutter rest is provided with a rootstock cutter and a scion cutter; the rootstock cutter and the scion cutter are arranged in parallel, an inclination angle of the rootstock cutter is adapted to an inclination angle of the first feed slot, and an inclination angle of the scion cutter is adapted to an inclination angle of the second feed slot.

16. The grafting method based on the grafting device according to claim 15, wherein the adhesive spraying mechanism comprises the spray valve, an adhesive storage tank and a displacement platform;

the displacement platform is arranged on the workbench, the spray valve and the adhesive storage tank are arranged on the displacement platform, and the spray valve communicates with the adhesive storage tank;

wherein the spray valve is configured for spraying the UV adhesive on the periphery of the joint portion of the rootstock and the scion.

17. The grafting method based on the grafting device according to claim 16, wherein the curing mechanism comprises a support and a UV light source;

the support is arranged on the workbench, the UV light source is arranged on the support, and the UV light source is configured to irradiate the UV adhesive through ultraviolet rays to cure the UV adhesive.

18. The grafting method based on the grafting device according to claim 16, wherein the seedling unloading mechanism comprises a clamping assembly and a belt conveying assembly;

the clamping assembly comprises a flexible seedling clamping jaw, a rotation driving member and a fifth telescopic driving member;

the fifth telescopic driving member is arranged on the workbench, an output end of the fifth telescopic driving member is connected with the rotation driving member, and an output end of the rotation driving member is connected with the flexible seedling clamping jaw;

the fifth telescopic driving member is configured for driving the rotation driving member to reciprocate in the horizontal direction, and the rotation driving member is configured for driving the flexible seedling clamping jaw to switch between a first state and a second state;

under a condition that the flexible seedling clamping jaw is at the first state, the flexible seedling clamping jaw is configured to be arranged along the horizontal direction; and under a condition that the flexible seedling clamping jaw is at the second state, the flexible seedling clamping jaw is configured to be arranged along a vertical direction.

* * * * *